(12) United States Patent
Shirasawa

(10) Patent No.: US 7,864,371 B2
(45) Date of Patent: Jan. 4, 2011

(54) IMAGE PROCESSING APPARATUS, IMAGE PROCESSING METHOD, AND COMPUTER PRODUCT

(75) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 12/032,311

(22) Filed: Feb. 15, 2008

(65) Prior Publication Data

US 2008/0218779 A1    Sep. 11, 2008

(30) Foreign Application Priority Data

Mar. 7, 2007    (JP) ............................. 2007-057578

(51) Int. Cl.
*G06F 15/00*    (2006.01)
*G03F 3/06*    (2006.01)
*G06K 9/00*    (2006.01)

(52) U.S. Cl. ..................... 358/1.9; 358/518; 358/523; 382/167

(58) Field of Classification Search ................. 358/523, 358/520, 518, 525, 528, 521, 524, 530, 1.9; 382/167, 166, 162
See application file for complete search history.

(56) References Cited

U.S. PATENT DOCUMENTS 5,963,201 A * 10/1999 McGreggor et al. ......... 715/722

| 2005/0094871 | A1* | 5/2005 | Berns et al. | 382/162 |
| 2006/0193018 | A1* | 8/2006 | Ito et al. | 358/518 |
| 2006/0285742 | A1* | 12/2006 | Arai et al. | 382/162 |

FOREIGN PATENT DOCUMENTS

| JP | 2000-50092 | 2/2000 |
| JP | 3513334 | 1/2004 |
| JP | 2004-153340 | 5/2004 |
| JP | 3566350 | 6/2004 |
| JP | 2005-269200 | 9/2005 |
| JP | 2005-295047 | 10/2005 |
| JP | 2005-295153 | 10/2005 |
| JP | 3980343 | 7/2007 |

\* cited by examiner

*Primary Examiner*—Madeleine A Nguyen
(74) *Attorney, Agent, or Firm*—Cooper & Dunham LLP

(57) ABSTRACT

An image processing apparatus includes a first storage unit, a second storage unit, a selecting unit, a first converting unit, a second converting unit, and a compressing unit. The second storage unit stores therein data on a color reproduction area of an output device. The first storage unit stores therein data on virtual color reproduction areas. The selecting unit selects one of the virtual color reproduction areas similar to the color reproduction area of the output device. The first converting unit compresses and maps image data to a virtual color reproduction range based on the selected one of the virtual color reproduction areas. The compressing unit compresses and maps the image data to a color reproduction range of an output device. The second converting unit converts the image data to a control signal.

18 Claims, 30 Drawing Sheets

|  | LIGHTNESS L | CHROMA C | HUE H |
|---|---|---|---|
| WHITE | 100 | 0 | 0 |
| RED | 50 | 85 | 40 |
| MAGENTA | 53 | 72 | 0 |
| BLUE | 25 | 55 | 300 |
| CYAN | 60 | 65 | 220 |
| GREEN | 50 | 80 | 120 |
| YELLOW | 96 | 100 | 90 |
| BLACK | 0 | 0 | 0 |

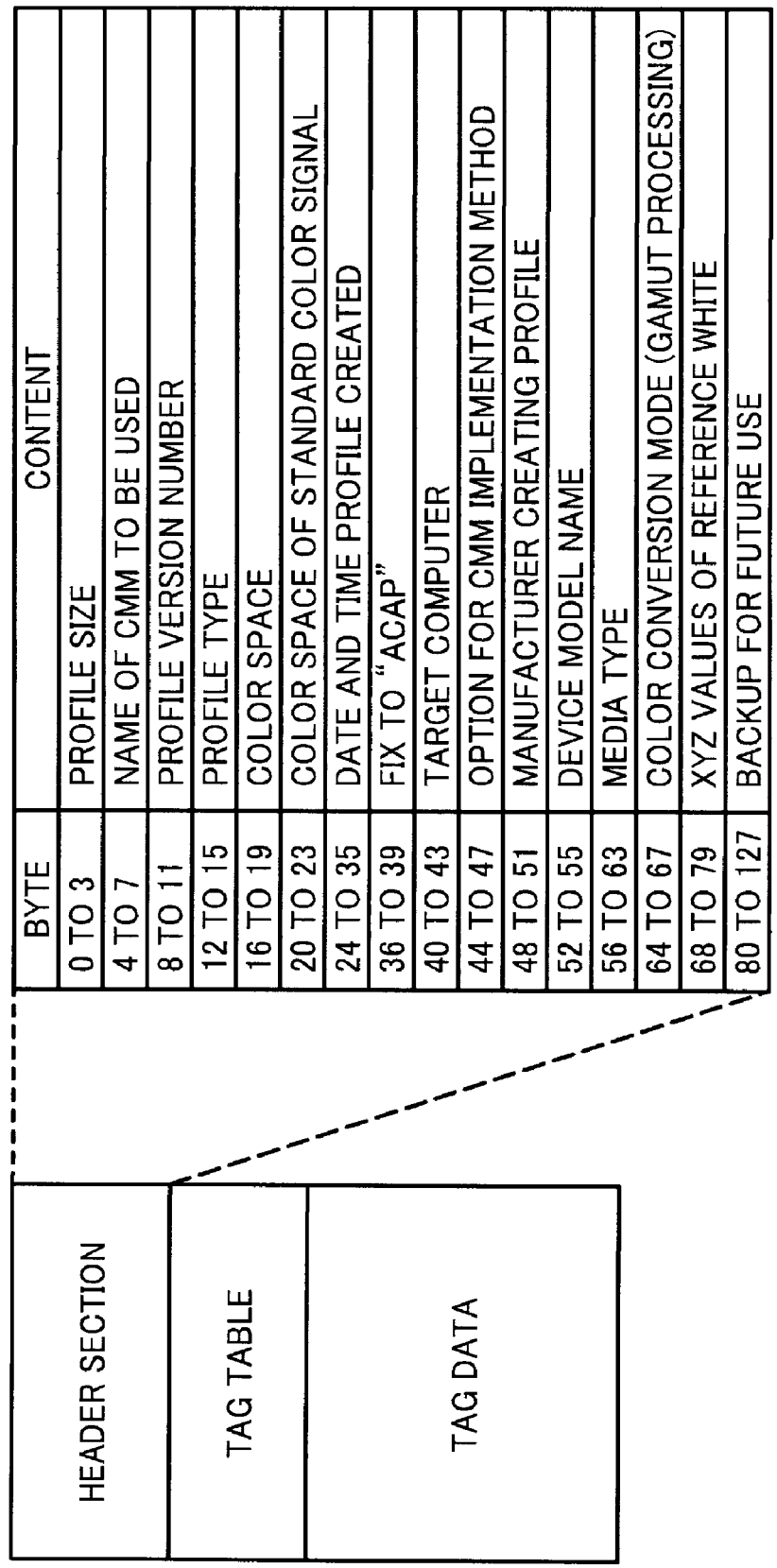

FIG. 18

| BYTE | CONTENT |
|---|---|
| 0 TO 3 | PROFILE SIZE |
| 4 TO 7 | NAME OF CMM TO BE USED |
| 8 TO 11 | PROFILE VERSION NUMBER |
| 12 TO 15 | PROFILE TYPE |
| 16 TO 19 | COLOR SPACE |
| 20 TO 23 | COLOR SPACE OF STANDARD COLOR SIGNAL |
| 24 TO 35 | DATE AND TIME PROFILE CREATED |
| 36 TO 39 | FIX TO "ACAP" |
| 40 TO 43 | TARGET COMPUTER |
| 44 TO 47 | OPTION FOR CMM IMPLEMENTATION METHOD |
| 48 TO 51 | MANUFACTURER CREATING PROFILE |
| 52 TO 55 | DEVICE MODEL NAME |
| 56 TO 63 | MEDIA TYPE |
| 64 TO 67 | COLOR CONVERSION MODE (GAMUT PROCESSING) |
| 68 TO 79 | XYZ VALUES OF REFERENCE WHITE |
| 80 TO 127 | BACKUP FOR FUTURE USE |

HEADER SECTION

TAG TABLE

TAG DATA

FIG. 25

COLOR REPRODUCTION RANGE TABLE

| L \ H | 0° | 30° | .... | 180° | .... | 300° | 330° |
|---|---|---|---|---|---|---|---|
| 0 | | | | | | | |
| 10 | | | | | | | |
| : | | | POLYGON ID | | | | |
| 80 | | | | | | | |
| 90 | | | | | | | |

POLYGON LIST

| POLYGON ID | PEAK POINT ID | | |
|---|---|---|---|
| 1 | 1 | 3 | 5 |
| 2 | 1 | 2 | 4 |
| 3 | 2 | 3 | 6 |
| : | : | : | : |
| 300 | 145 | 150 | 152 |

PEAK POINT LIST

| ID | C | M | Y | L* | Ca* | Cb* |
|---|---|---|---|---|---|---|
| 1 | 0 | 0 | 0 | 90 | 0 | 0 |
| 2 | 0 | 0 | 51 | 86 | −5 | 40 |
| : | : | : | : | : | : | : |
| 151 | 255 | 255 | 204 | 6 | −1 | −5 |
| 152 | 255 | 255 | 255 | 5 | 0 | 0 |

FIG. 29
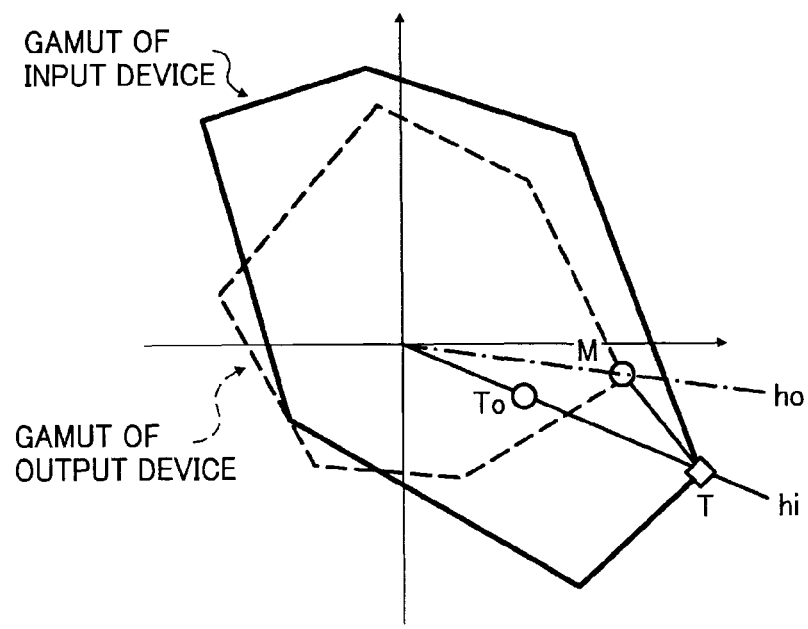
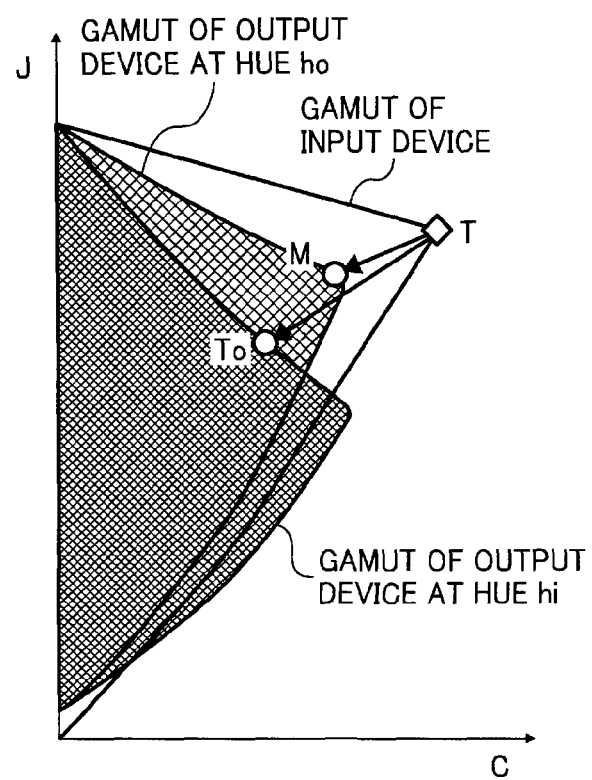

IMAGE PROCESSING APPARATUS, IMAGE PROCESSING METHOD, AND COMPUTER PRODUCT

CROSS-REFERENCE TO RELATED APPLICATIONS

The present application claims priority to and incorporates by reference the entire contents of Japanese priority document 2007-057578 filed in Japan on Mar. 7, 2007.

BACKGROUND

1. Technical Field

This disclosure relates to an image processing apparatus, an image processing method, and a computer product.

2. Description of the Related Art

Color matching systems (CMSs) have been developed that perform color matching process on color image data stored in a computer to output it to a color output device such as a color printer.

Basically, in the CMS, image data represented by a red, green, and blue (RGB) signal is converted to a color signal used in an output device and metrically matching the image data. Colors appearing on display devices, however, cannot be reproduced as they are because a color reproduction range (color gamut) of an electrophotographic printer or an ink-jet printer is significantly smaller than that of display devices. Technology for mapping colors not reproducible by an output device to reproducible colors (hereinafter, "gamut compression") has been known and proposed as various methods. For example, one such technology reproduces a color not reproducible by an output device, with a color having a minimum color difference calculated by changing the lightness, chroma, and hue weighting of a color reproducible by the output device. Another such technology causes, by setting a projection target on an achromatic axis or on a chromatic axis of a hue matching a hue of an input color signal, colors outside a gamut of an output device to have a uniform hue, thereby compressing and mapping the colors to fall within the gamut of the output device.

Because a color reproduction range of an electrophotographic printer or an ink-jet printer is significantly smaller than that of display devices, the gamut compression technology causes a large difference in reproduced colors even with a slight difference in setting conditions of the gamut compression methods. Further, due to inconsistency of color reproduction ranges of an output device, reproduced colors may appear different even by applying the same gamut compression method.

For this reason, color conversion methods have been proposed for matching colors of a plurality of output devices.

For example, Japanese Patent Application Laid-open No. 2000-50092 discloses color conversion including converting an input color signal to a standard input color space (sRGB), converting the standard input color space to a standard output color space (sCMYK), and converting the standard output color space to an output color space of a printer. Japanese Patent No. 3513334 discloses a conventional technology in which colors are processed commonly for a plurality of output devices in a device-independent color space, and then converted to device-specific color signals by using device-specific profiles. In this publication, colors are processed commonly for a plurality of devices by finding a common color reproduction range reproducible by any of the output devices, and then converting the colors by using color profiles for processing the gamut of the colors to the common color reproduction range. In this way, colors of the devices are equalized.

Japanese Patent Application Laid-open No. 2005-269200 discloses another conventional technology in which a color space is compressed in a color reproduction range of an output device of a type other than that of a target output device, and then compressed in a color reproduction range of the target output device. Japanese Patent Application Laid-open No. 2002-252785 discloses still another conventional technology in which a gamut is compressed based on a virtual color reproduction range that covers color reproduction ranges of a plurality of output devices, and then compressed in a color reproduction range of each of the devices, allowing colors to be perceived as almost the same colors. Japanese Patent Application Laid-open No. 2004-153340 discloses gamut compression including reading respective target colors of a plurality of output devices, and then defining a common hue line. Japanese Patent Application Laid-open No. 2005-295047 discloses still another conventional technology in which a virtual color reproduction range is determined that has a proper size covering color reproduction ranges of a plurality of output devices, and that satisfies certain criteria with regard to a content rate of a reference color.

With the conventional technology disclosed in Japanese Patent No. 3513334, color reproduction ranges of the output devices are analyzed, and colors are reproduced by using a common color reproduction range reproducible by all the output devices. Because the color reproduction range is adjusted to a smaller color reproduction range of the devices, color reproduction capabilities of the devices cannot be fully utilized (FIG. 33A).

In the conventional technology disclosed in Japanese Patent Application Laid-open No. 2005-269200, an output device having a preferable color reproduction range is used as a reference output device. This method also fails to fully utilize a color reproduction capability of an output device having a larger color reproduction range than that of the reference output device.

With the conventional technologies disclosed in Japanese Patent Applications Laid-open Nos. 2002-252785, 2004-153340, and 2005-295047, colors are subjected to common gamut processing by using a virtual color reproduction range that covers color reproduction ranges of a plurality of output devices, and then converted to colors within the color reproduction ranges of the devices. This method causes a difference in size and shape between the virtual color reproduction range and the color reproduction ranges of the output devices. As a result, reproduced colors vary depending on a color conversion system converting colors from the common reproduction range to reproduction ranges of the output devices, failing to equalize the colors (FIG. 33B).

As such, the conventional technologies do not provide desirable color reproduction when common color reproduction information differs from color reproduction ranges of output devices with regard to shape and size. Further, a virtual color reproduction range for defining a target reproduction color significantly differs from the color reproduction ranges of output devices, causing a large difference between the target reproduction color and optimum output colors for the output devices.

SUMMARY

According to an aspect of this disclosure, there is provided an image processing apparatus that converts an input color signal to a color signal reproducible by an output device. The image processing apparatus includes a storage unit that stores therein a target reproduction color for a standard color reproduction range corresponding to average size and shape of a plurality of color reproduction ranges of a plurality of output devices; and a converting unit that converts, by referring to the storage unit, an input color signal to a color signal reproducible by the output devices.

According to another aspect of this disclosure, there is provided an image processing apparatus that converts an input color signal to a color signal reproducible by an output device. The image processing apparatus includes a first storage unit that stores therein first data on a plurality of virtual color reproduction areas and target color data corresponding to each of the virtual color reproduction areas; a second storage unit that stores therein second data on a color reproduction area of the output device; a selecting unit that compares the first data and the second data to select a virtual color reproduction area; a first converting unit that converts, based on target color data corresponding to the virtual color reproduction area selected by the selecting unit, an input color signal to a color signal falling within the virtual color reproduction area; and a second converting unit that converts the color signal obtained by the first converting unit to a color signal falling within the color reproduction area of the output device.

According to still another aspect, there is provided an image processing method of converting an input color signal to a color signal reproducible by an output device. The image processing method includes storing, in a storage unit, a target reproduction color for a standard color reproduction range corresponding to average size and shape of a plurality of color reproduction ranges of a plurality of output devices; and converting, by referring to the storage unit, an input color signal to a color signal reproducible by the output devices.

The above and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 18 is an example of a data structure of an ICC profile;

FIG. 25 is an example of data on color reproduction ranges;

FIG. 29 is a schematic diagram for explaining hue correction;

DETAILED DESCRIPTION OF THE PREFERRED EMBODIMENTS

Exemplary embodiments of the present invention are described in detail below with reference to accompanying drawings.

Figure 1:
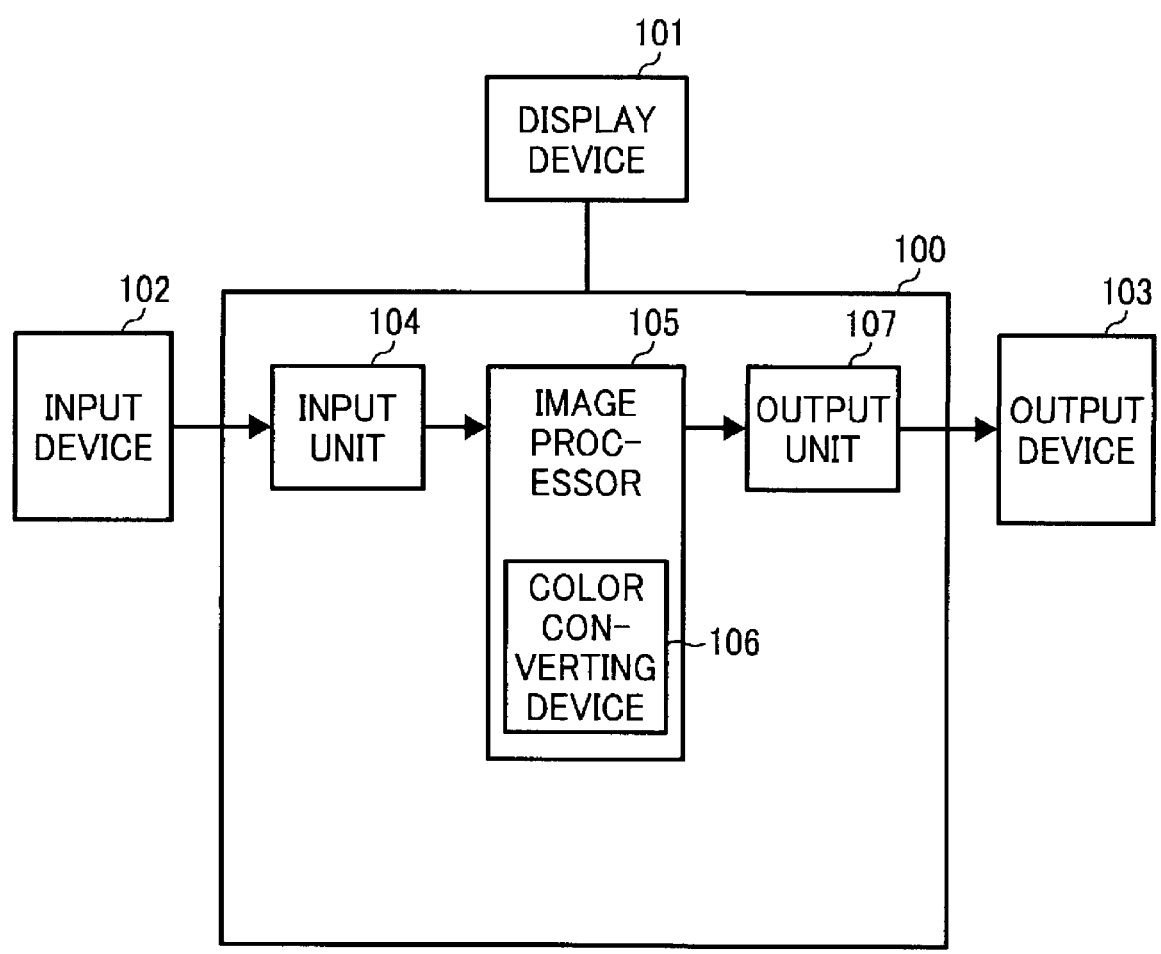
FIG. 1 is a block diagram of an image processing system according to a first embodiment of the present invention.

FIG. 1 is a block diagram of an image processing system according to a first embodiment of the present invention. The image processing system includes an image processing apparatus 100, a display device 101, an input device 102, and an output device 103. The image processing apparatus 100 includes an input unit 104, an image processor 105, and an output unit 107. Image data read from the input device 102 is input to the input unit 104, subjected to color conversion process by a color converting device 106 included in the image processor 105, and output to the output device 103 via the output unit 107. Further, the image processing apparatus 100 is coupled to the display device 101 to display an image allowing a user to create a profile.

The input device 102 is used to input image data. As the input device 102, an input device such as a digital still camera or a scanner can be used. Further, the input device 102 can be used to input image data that has once been stored in a hard disk drive or the like. The output device 103 prints out image data. As the output device 103, an image forming device such as a color printer or a color facsimile machine can be used.

Figure 2:
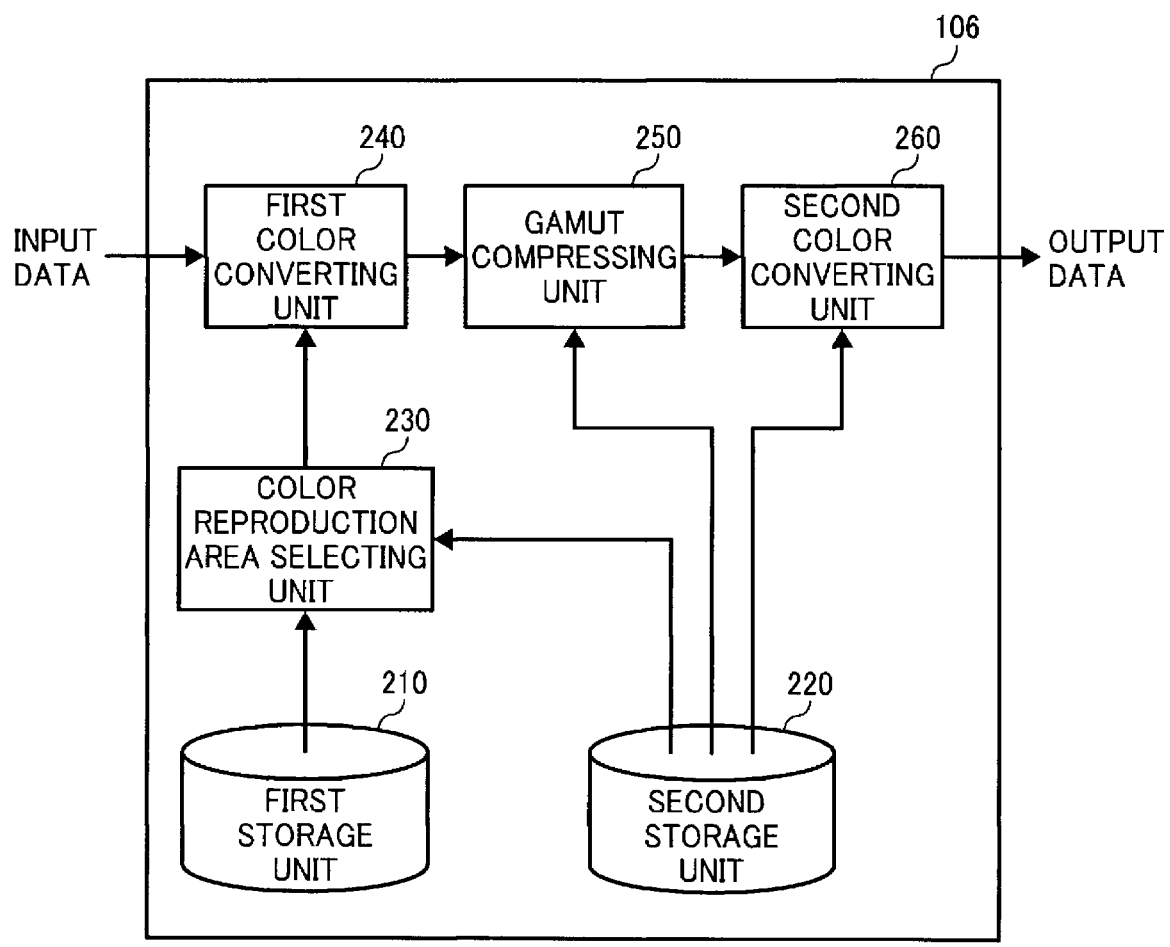
FIG. 2 is a block diagram of a color converting device shown in FIG. 1.

FIG. 2 is a block diagram of the color converting device 105. The color converting device 106 includes a first storage unit 210, a second storage unit 220, a color reproduction area selecting unit 230, a first color converting unit 240, a gamut compressing unit 250, and a second color converting unit 260. The second storage unit 220 stores therein color reproduction area information Sd indicating a range in which the output device 103 can reproduce colors. The first storage unit 210 stores therein information on a plurality of virtual color reproduction areas, and target color data corresponding to the color reproduction areas. The color reproduction area selecting unit 230 selects, by referring to information stored in the second storage unit 220, a color reproduction area Sv that is similar to a color reproduction area of the output device 103, from among the color reproduction areas stored in the first storage unit 210. The first color converting unit 240 compresses and maps color data to a virtual color reproduction area, by referring to information on the color reproduction area Sv selected by the color reproduction area selecting unit 230. The gamut compressing unit 250 compresses and maps the color data to a color reproduction range of an actual printer, by referring to information stored in the second storage unit 220. The second color converting unit 260 converts a color signal, converted by the gamut compressing unit 250, to a control signal (CMY or CMYK) of a printer.

The image data input to the color converting device 106 is specifically gradation data of RGB colors. A typical gradation level of each color component is eight bits=256, and can be other gradation levels such as 64 and 512.

The following describes operations performed by the color converting device 106 in detail.

The first storage unit 210 stores therein pieces of virtual color reproduction area information and tables of color reproduction target values corresponding to the pieces of virtual color reproduction area information. The color reproduction area selecting unit 230 selects, from the information stored in the first storage unit 210, a color reproduction area Sv that is similar to the color reproduction area of the output device 103.

Described below is a specific example of such virtual color reproduction area information. A virtual color reproduction area is an artificially defined color reproduction area. According to the first embodiment, the virtual color reproduction area is defined with coordinate values of eight defining points (red (R), green (G), blue (B), cyan (C), magenta (M), yellow (Y), white (W), and black (K)) in a device independent color space. Such device independent color space is known as an L*a*b* color space, an XYZ color space, and a CIECAM02 space. The first embodiment describes an L*a*b* color space as a device independent color space, and coordinate values of lightness L, chroma C, and hue H held as the color reproduction area information.

By defining a normal L*a*b* for W to be [100, 0, 0], and a normal L*a*b* for K is [0, 0, 0], the color reproduction area information includes six defining colors of R, G, B, C, M, and Y.

Figures 3A, 3B:
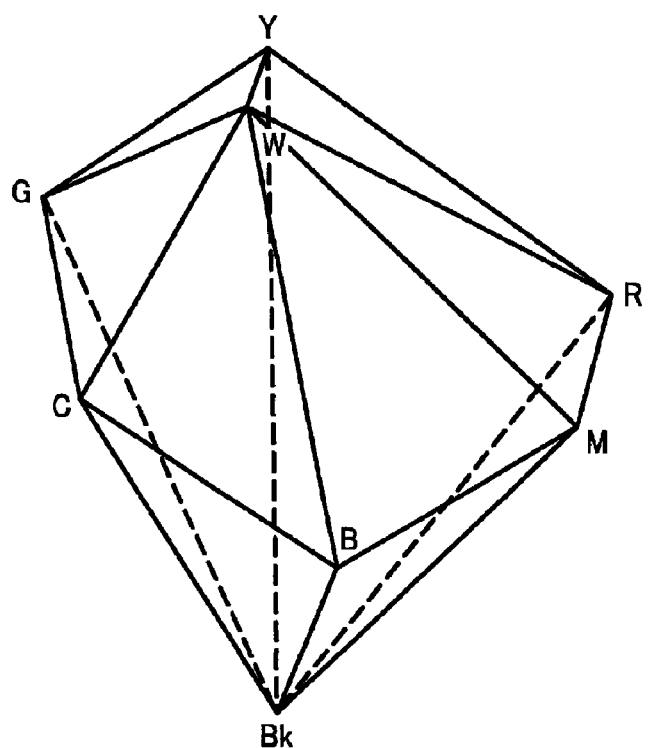
FIGS. 3A and 3B are examples of virtual color reproduction area information according to the first embodiment.

FIG. 3A is an example of virtual color reproduction area information. FIG. 3B is a plot diagram of a color reproduction area in the L*a*b space. In FIG. 3A, a lightness of white is defined as 100, and a lightness of black is defined as 0. Although such black and white lightnesses cannot be reproduced by a printer, giving such definition provides definition of a virtual color reproduction area that completely covers a color reproduction area of an output device, as a simple polyhedral body. For example, a virtual color reproduction area defined with the eight characteristic points can be represented as a simple polyhedral body as shown in FIG. 3B when projected in the L*a*b* space. Because the virtual color reproduction area has a simple shape compared with a color reproduction area of an actual output device, a target color with good continuous tone can be readily set.

Figure 4:
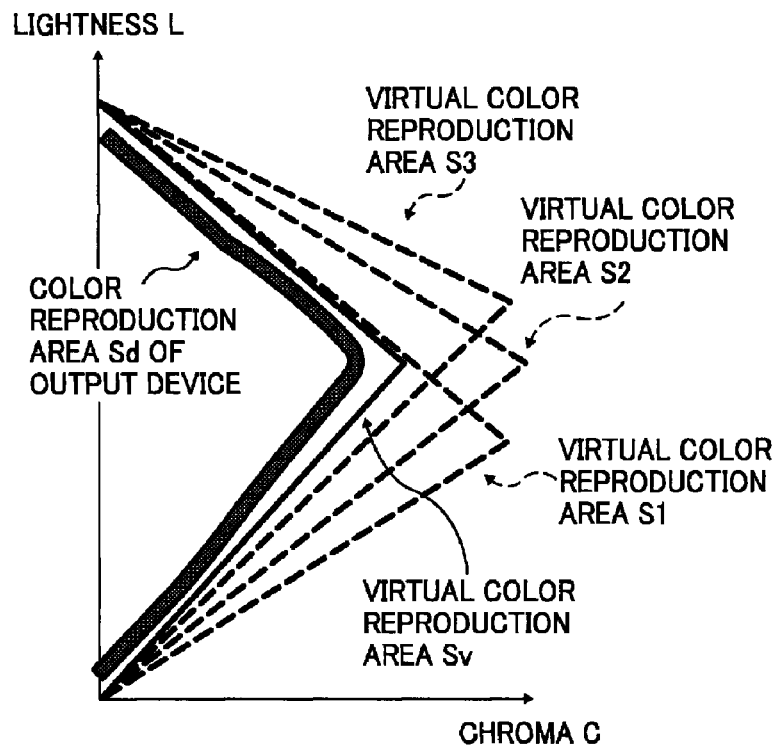
FIG. 4 is a schematic diagram for explaining a virtual color reproduction area according to the first embodiment.

FIG. 4 depicts gamut shapes of a plurality of virtual color reproduction areas in a constant hue cross section. As shown in FIG. 4, the virtual color reproduction areas vary in shape and size. The color reproduction area selecting unit 230 selects a virtual color reproduction area Sv (thin solid line) that is similar in shape to a color reproduction area Sd (bold line) of an output device with a method described later.

The following describes a table of color reproduction target values (input profile) held in the first storage unit 210. The input profile describes a relation between RGB values of an input color signal and coordinate values in a device independent color space. As described above, an L*a*b* color space is used as the device independent color space.

Figure 5:
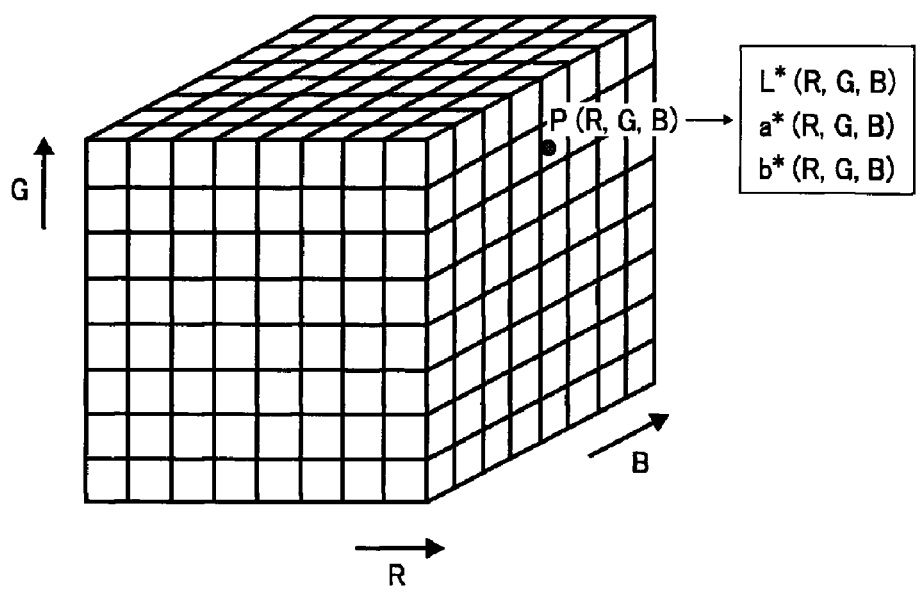
FIG. 5 is a schematic diagram for explaining a coordinate point in an input color space.
Figure 6:
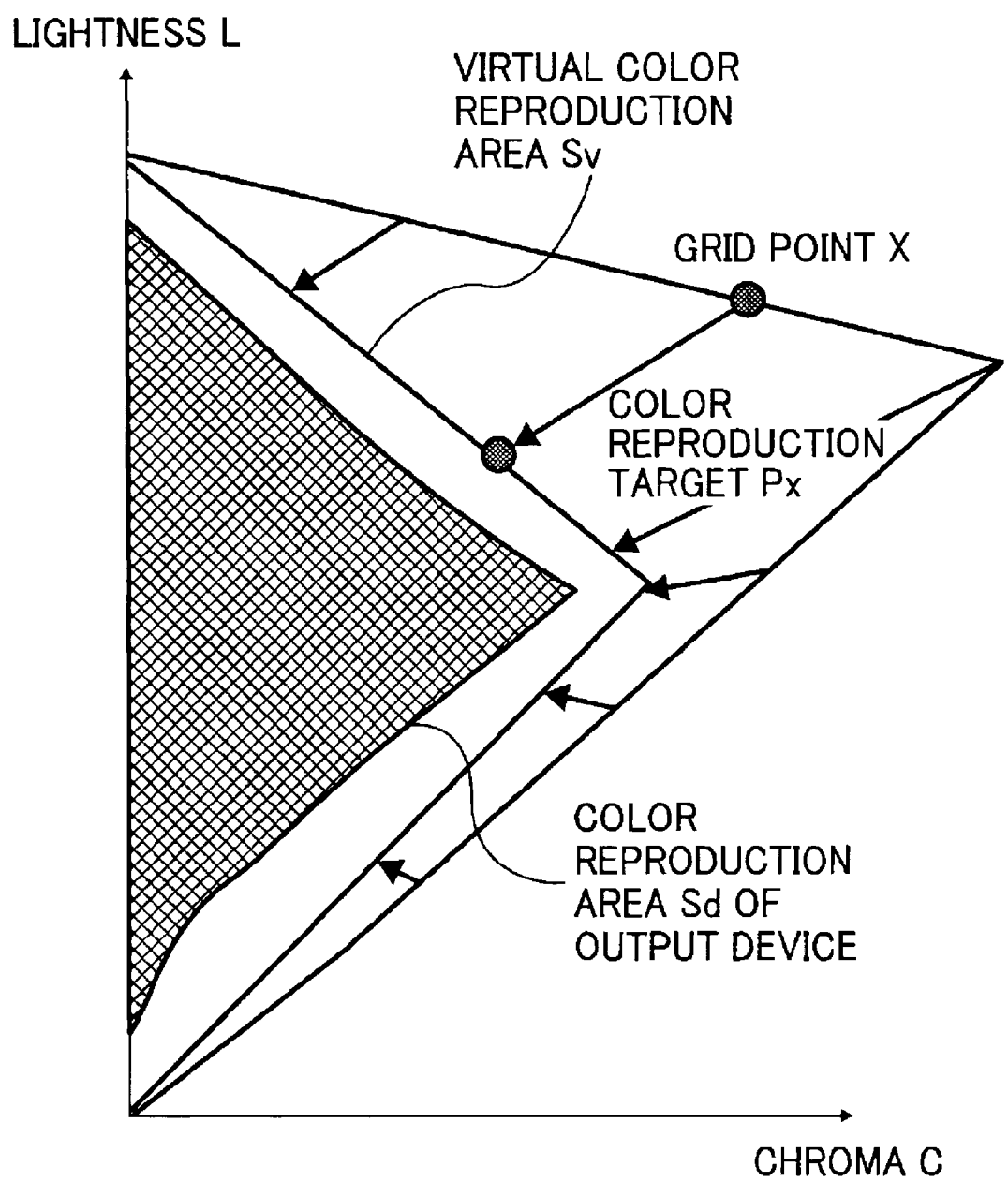
FIG. 6 is a schematic diagram of a color reproduction target for the virtual color reproduction area.

The color reproduction target values described in the input profile are held in a three-dimensional lookup table in which L*a*b* values are defined for an n×n×n grid point (e.g., X in FIG. 6) in an input RGB color space as shown in FIG. 5. Specifically, the color reproduction target values held in the first storage unit 210 are color data (Px of FIG. 6) subjected to any gamut compression including manual adjustment, with respect to a virtual color reproduction range. Various gamut compression methods can be used, such as compression methods giving emphasis on holding tones, or compression methods allowing a minimum color difference.

Figure 7:
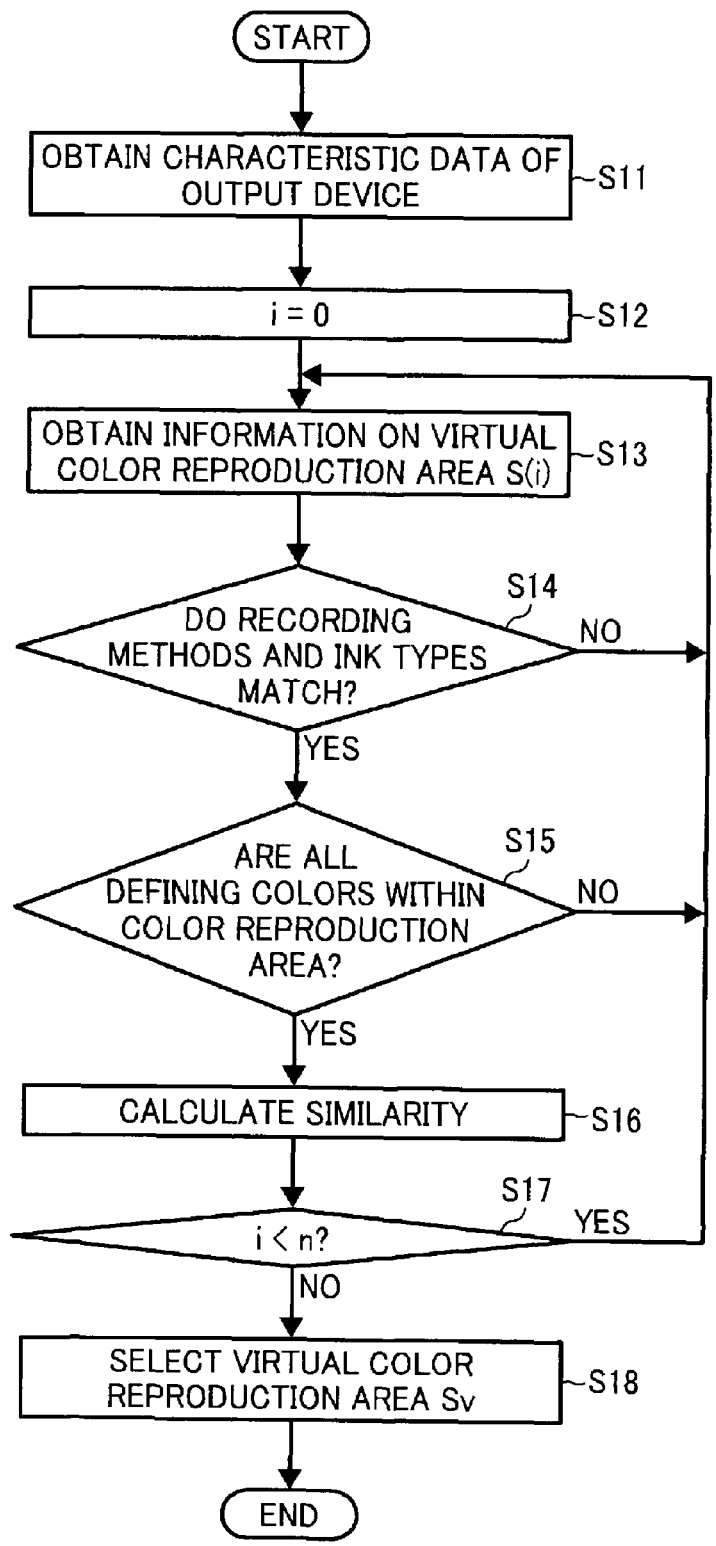
FIG. 7 is a flowchart of a process for selecting a color reproduction area.

FIG. 7 is a flowchart of a process for selecting a virtual color reproduction area Sv from a plurality of virtual color reproduction areas.

A color reproduction area Sv is selected to fully utilize the color reproduction capability of an output device. Specifically, such a color reproduction area is selected that covers a color reproduction area of an output device, and that has L, C, H values being similar to color reproduction area information of the output device with regard to R, G, B, C, M, and Y colors.

At steps S11 and S12, characteristic data on an output device is read out by referring to information stored in the second storage unit 220, and a value i is initialized to zero. As the characteristic data, the color reproduction area information and information on a recording method and an ink type are read at the same time. The recording method can be an electrophotographic method or an ink-jet method.

At step S13, from the first storage unit 210, virtual color reproduction area information S(i) and information on recording methods and ink types are read out.

At step S14, determination is made on whether the recording methods and the ink types match between the output device and the virtual color reproduction area. If the recording methods or the ink types do not match, the process control goes back to step S13, so that determination is to be made on the next virtual color reproduction area information.

From steps S15 to S17, comparison is made between the color reproduction area information Sd of the output device and the virtual color reproduction area information S(i). Assume that L, C, and H values of the eight defining colors R, G, B, C, M, Y, W, and K have been defined as the virtual color reproduction area information.

At step S15, determination is made on whether the eight defining colors of the output device are inside or outside the virtual color reproduction area. To make the determination, a known method (e.g., a method disclosed in Japanese Patent No. 3566350) can be used. As a result of the determination, if all the eight defining colors are inside the virtual color reproduction area, the process control goes to step S16. If any of the defining colors is outside the area, the area is regarded not suitable and the process control goes back to step S13, so that determination is to be made on the next virtual color reproduction area information.

At step S16, a similarity between the virtual color reproduction area and the color reproduction area of the output device is calculated. As the similarity, color differences in the defining colors between the color reproduction area of the output device and the virtual color reproduction area are calculated. As a color-difference formula, any of ΔEab, ΔE94, and ΔE2000 can be used, or a unique color-difference formula for varying the differences in lightness, chroma, and hue weighting can also be used. As a similarity of the virtual color reproduction area, a sum of color differences of the defining colors R, G, B, C, M, and Y is found.

By repeating steps S13 to S17, a virtual color reproduction area Sv having a minimum similarity is selected (S18). Then, a profile that describes color reproduction target values for the virtual color reproduction area Sv is sent to the first color converting unit 240.

The first color converting unit 240 performs, by using the input profile selected by the color reproduction area selecting unit 230, a color conversion process on input image data received from the input device 102.

Figure 8:
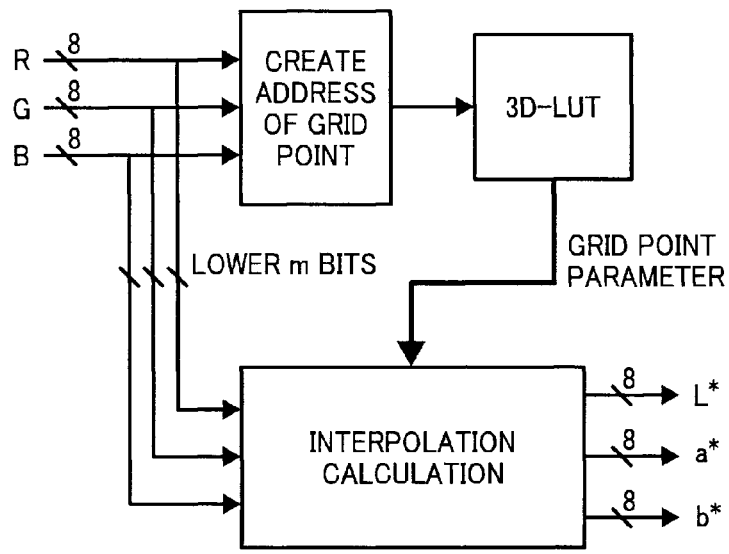
FIG. 8 is a schematic diagram of an interpolation calculating device.

The color converting device 106 performs the color conversion process with a memory map interpolation method using a three-dimensional lookup table (3D-LUT). As shown in FIG. 5, the memory map interpolation method includes dividing the input color space into solids of the same type (cubes in FIG. 5), and finding output values by using output values (=grid point output values) associated with peak points of a solid including an input color signal. For example, to find output values of an input coordinate P, a cube including the input coordinate is selected, and grid point parameters preset for the eight points of the selected cube are read out. Based on the position of the input coordinate in the cube (refer to lower m bits of the input signal), linear interpolation is performed (FIG. 8). In the first embodiment, the input color signal corresponds to an RGB signal, and the output coordinate P corresponds to an Lab signal. The grid point output values are employed from the 3D-LUT of the input profile and converted to a virtual target color (L*a*b* values) in the color conversion process.

Although the foregoing describes an example with solid interpolation, various memory map interpolation methods using a 3D-LUT have been proposed, such as tetrahedral interpolation, triangular prism interpolation, and cubic interpolation, any of which can be used.

The color data converted to a target color by the first color converting unit 240 is subjected to gamut compression to fall within a color reproduction range of an actual printer (output device) by the gamut compressing unit 250, based on color reproduction area information of an output device.

Figure 9:
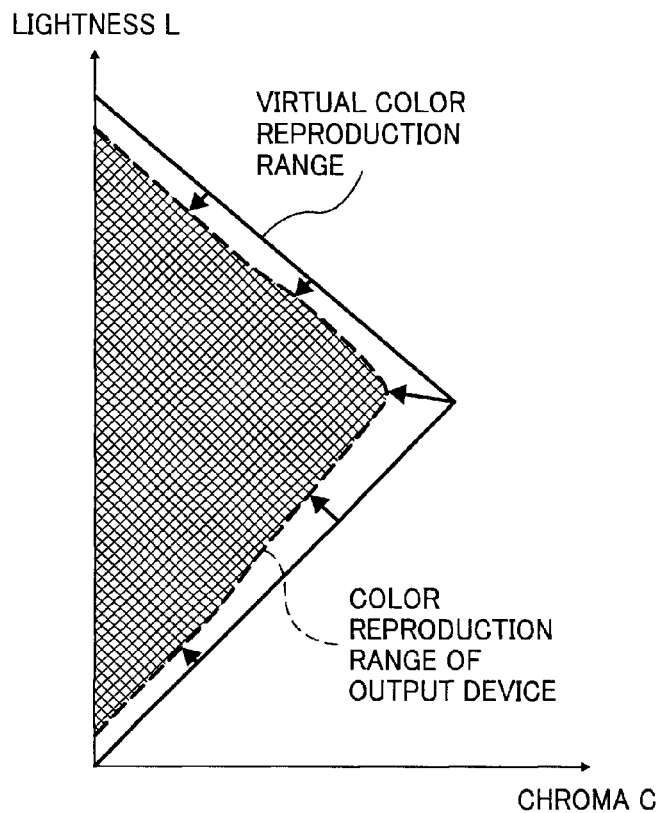
FIG. 9 is a schematic diagram for explaining gamut compression on a color reproduction area of an output device.

The gamut compression is performed such that colors within the color reproduction area of the output device (hatched portion in FIG. 9) are reproduced as they are. Colors outside the color reproduction area of the output device are mapped to an outermost line of the color reproduction area of the output device (as indicated by arrows in FIG. 9) to have a minimum color difference therebetween.

Because the virtual color reproduction area is similar to the color reproduction area of the output device, color reproduction of the printer would not be greatly affected by use of gamut compression methods other than the method allowing a minimum color difference. Thus, almost equalized colors can be reproduced.

The color data, compressed and mapped to the color reproduction area of the output device by the gamut compressing unit 250, is subjected to color conversion at the second color converting unit 260, based on the characteristics of the output device (color printer) 103 with regard to color values L*, a*, and b* in a uniform color space. The data is then converted to output color components C, M, and Y data, which are control signals of the output device (printer) 103.

For the color conversion for converting a device independent Lab signal to a CMY(K) signal at the second color converting unit 260, the memory map interpolation method can be used, or a color prediction formula using a neutral network or a polynomial formula can be used instead.

The image data generated in the color conversion process is sent to the output device 103, and printed out in colors. Although the first embodiment describes the process performed by the gamut compressing unit and the process performed by the second color converting unit separately, the two processes can be combined, so that an output profile for converting a device independent color signal to a color signal of an output device is created in advance. In this case, color data is converted to a device independent color signal at the first color converting unit by using an input profile, and then converted to an output signal at the second color converting unit by using an output profile.

Figure 10:
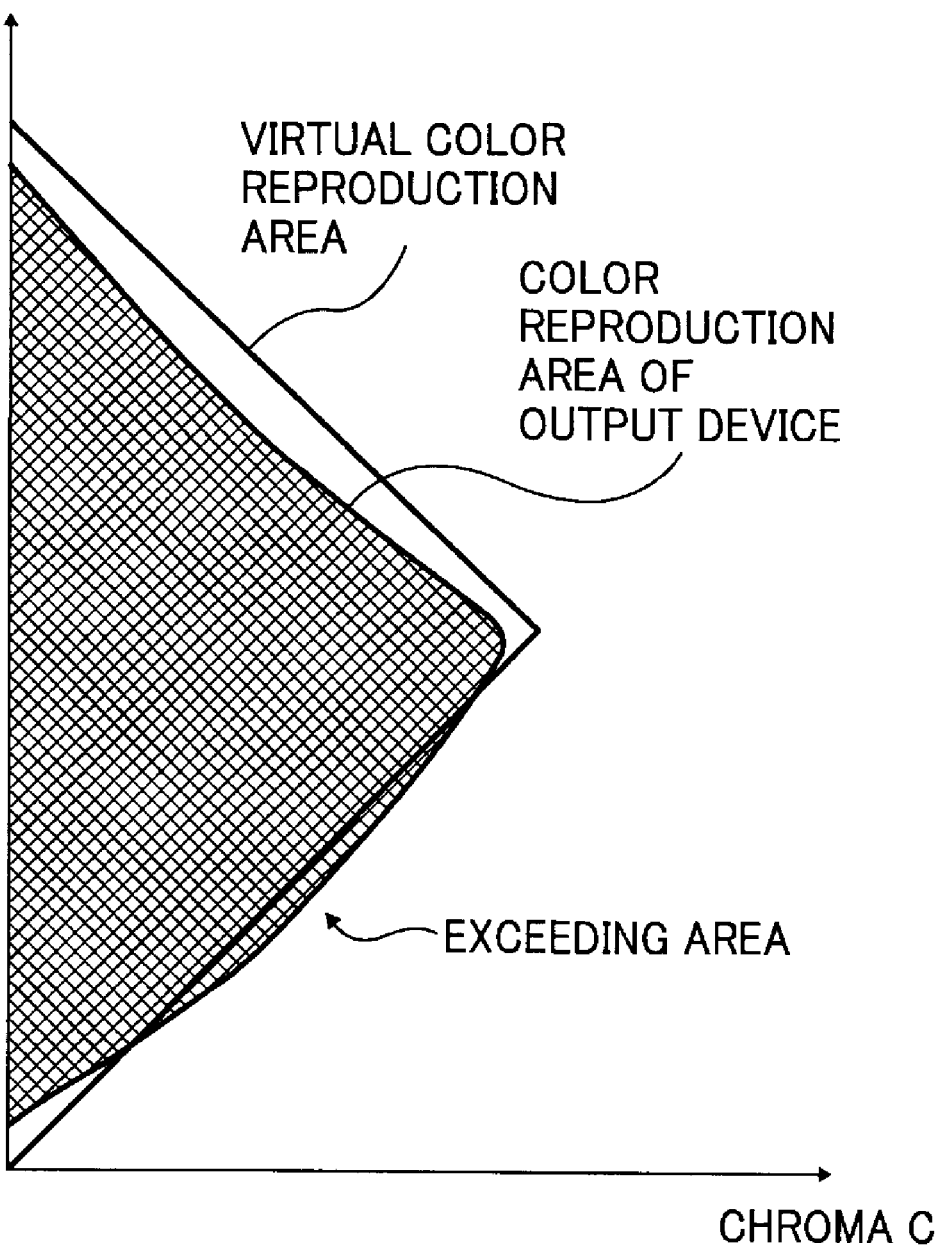
FIG. 10 is an example of a color reproduction area of an output device.

In the first embodiment, as color reproduction area information, the eight defining colors are held and defined in a dodecahedron. When the gamut surface of the output device is in a convex shape as shown in FIG. 10, the color reproduction area of the output device partially exceeds the virtual color reproduction area, even with the eight defining colors of the output device falling within the virtual color reproduction area. When such an output device is targeted, more specific color reproduction area information needs to be held.

Figure 11:
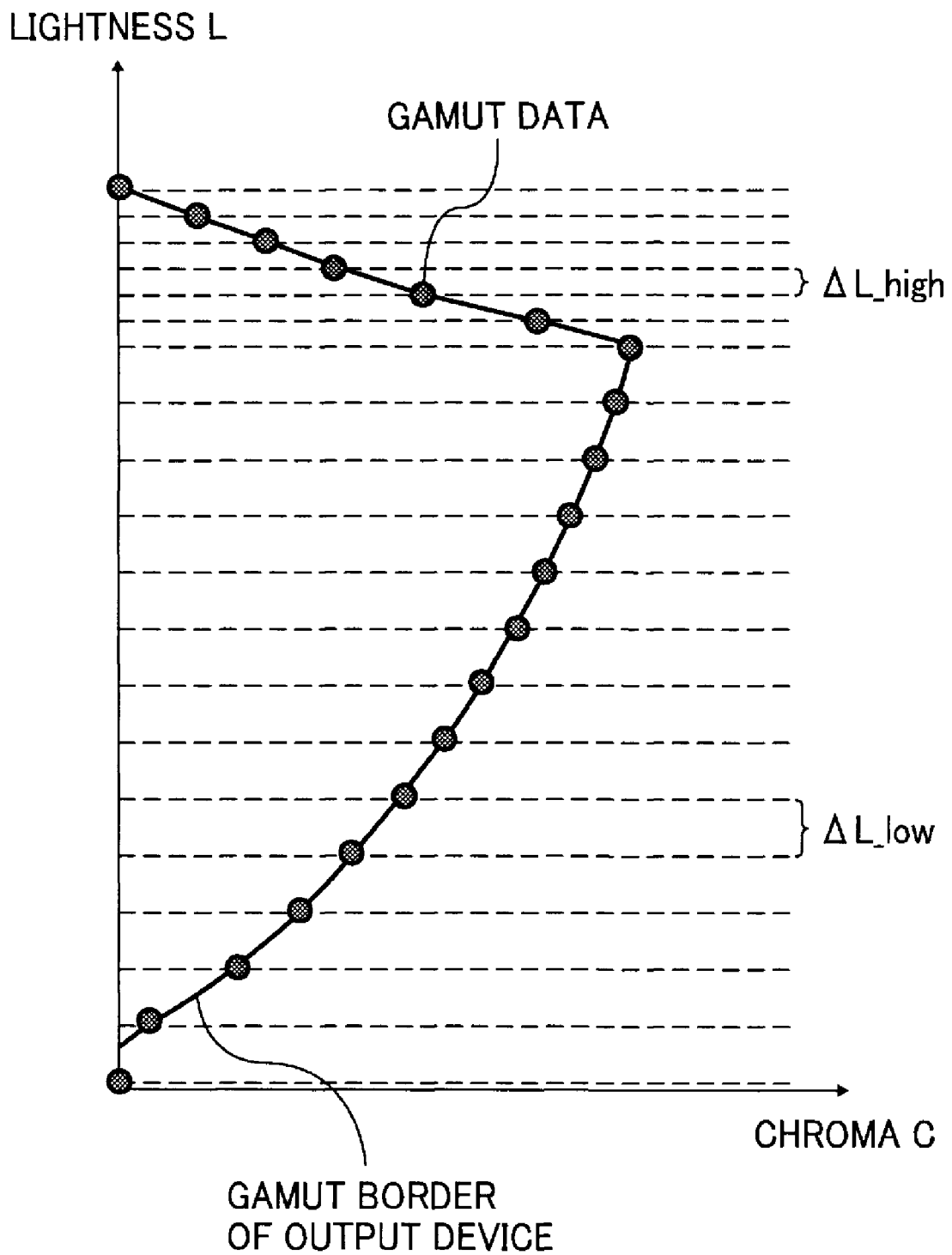
FIG. 11 is a schematic diagram for explaining creation of color reproduction area information according to a second embodiment of the present invention.

Referring to FIG. 11, the following describes color reproduction area information according to a second embodiment of the present invention. As shown in FIG. 11, the color reproduction area information is represented as a table of a data list that describes color signal values on a gamut border with regard to hue Hi defined in predetermined step width. Further, the color reproduction area information is created and stored in memory in advance. In the example of FIG. 11, the color signal values on the gamut border are recorded as maximum chroma Cmax at hue Hi and lightness Lj, and many sets of [Lj, Cmax, Hi] are provided as signal values of gamut data.

The gamut data can be found in predetermined hue steps, for example, by a hue angle of five degrees, or can be found in steps of uneven widths. To find gamut data, Lightness Lj can be divided such that the maximum lightness Lmax and the minimum lightness Lmin of the output device are equal. When the maximum chroma at hue Hi of the output device is biased either to a high lightness area or a low lightness area as shown in FIG. 11, equalizing lightness Lj causes a large difference in density of the gamut data between the high and the low lightness areas. Thus, the step width of Lj (ΔL_high and ΔL_low of FIG. 11) for defining the gamut data may be arranged to differ above and below the maximum chroma.

With the color reproduction area information created as such, comparison is made between the color reproduction area of the output device and the virtual color reproduction area with regard to the maximum chroma. In this way, accurate determination can be made on whether the virtual color reproduction area covers the color reproduction area of the output device.

Figure 12:
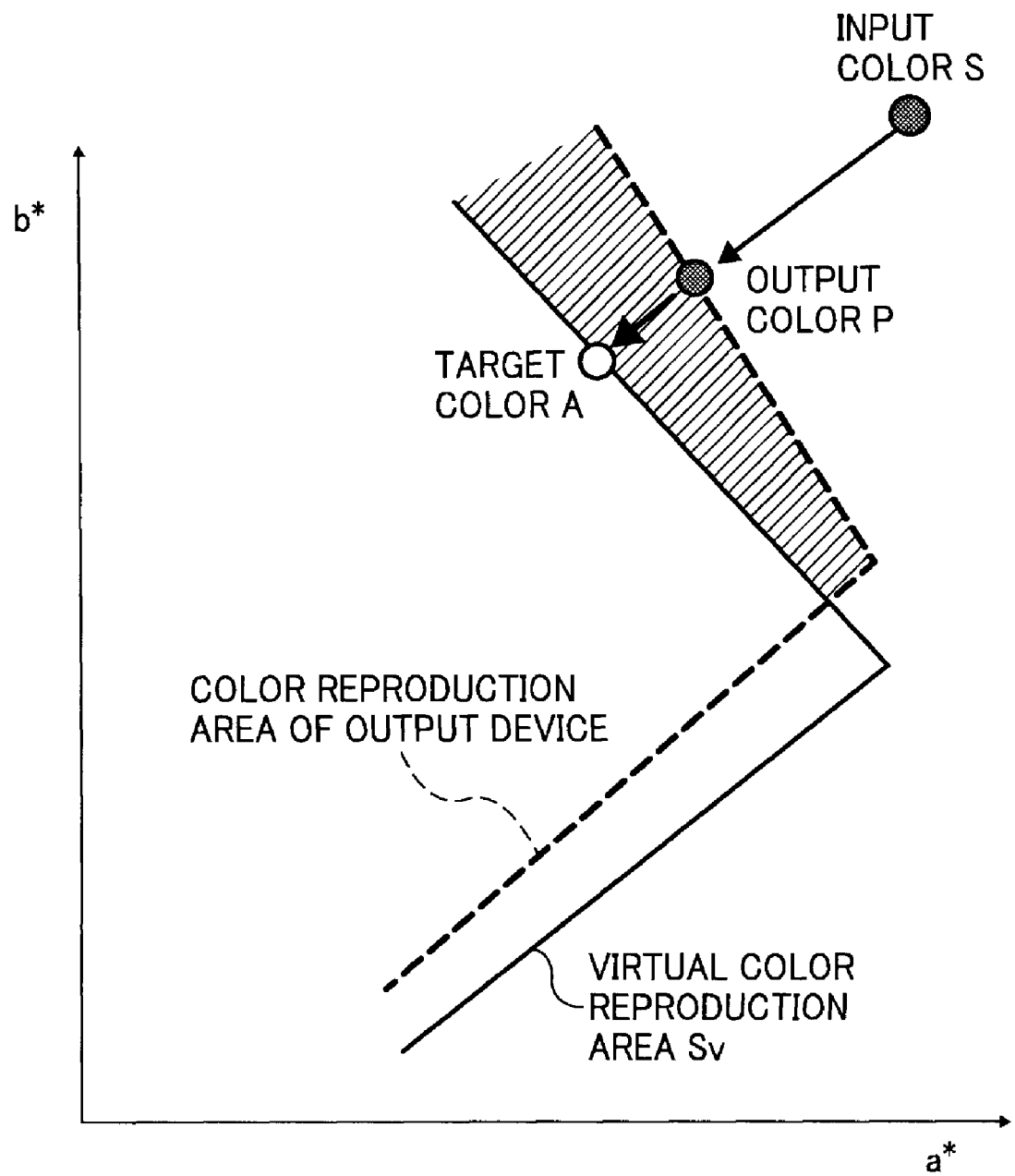
FIG. 12 is a schematic diagram for explaining a virtual color reproduction area according to a third embodiment of the present invention.

In the above embodiments, a virtual color reproduction area that covers the color reproduction area of the output device is selected. In a third embodiment of the present invention, a virtual color reproduction area that is partially smaller than the color reproduction area of the output device can also be selected. FIG. 12 depicts a virtual color reproduction area selected in the third embodiment. As shown in an a*b* plan view of the color reproduction area, in a shaded portion, the color reproduction area of the output device exceeds the virtual color reproduction area Sv.

Figure 13:
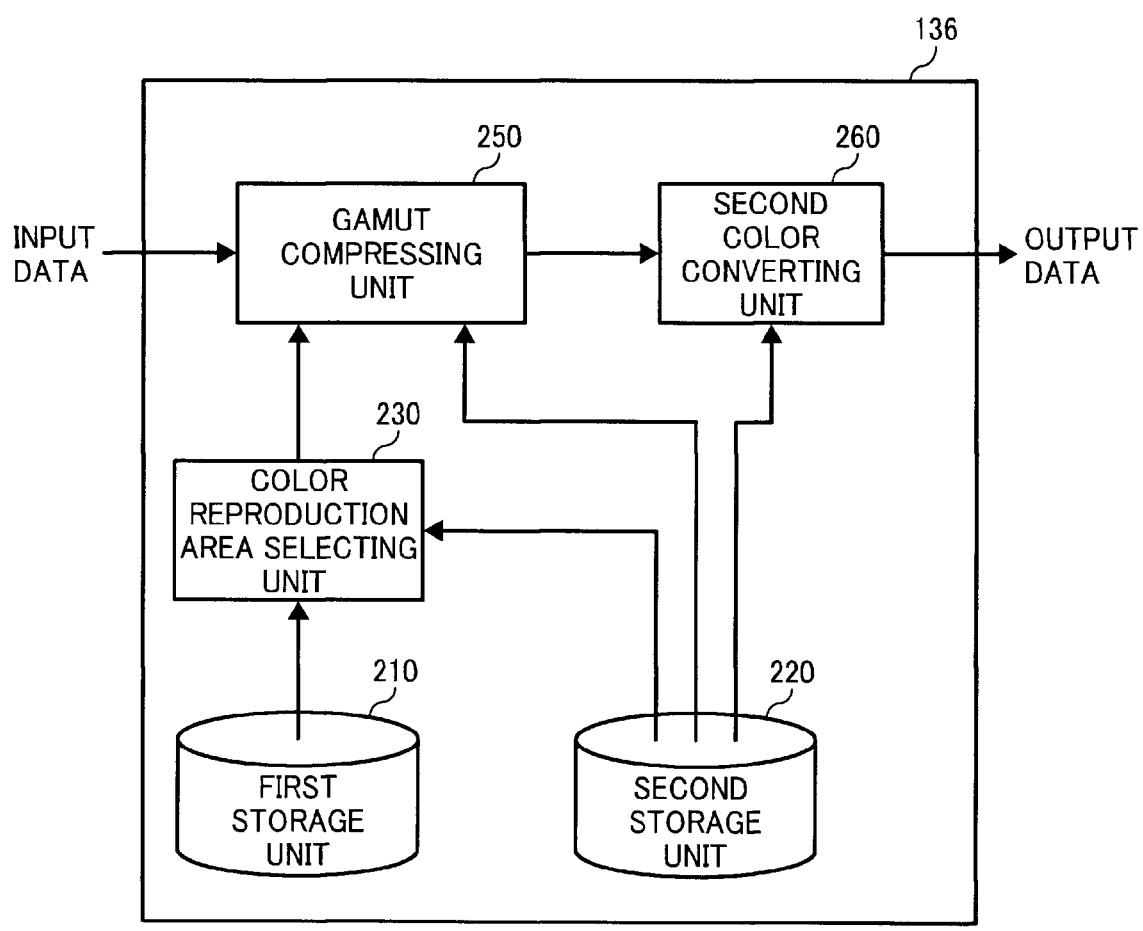
FIG. 13 is a block diagram of a color converting device according to the third embodiment.

FIG. 13 is a block diagram of a color converting device 136 according to the third embodiment. The color converting device 136 is of configuration basically similar as described previously in connection with FIG. 2. The second storage unit 220 stores therein the color reproduction area information Sd indicating a range in which the output device 103 can reproduce colors. The first storage unit 210 stores therein information on a plurality of virtual color reproduction areas, and target color data corresponding to the color reproduction areas. The color reproduction area selecting unit 230 selects, by referring to information stored in the second storage unit 220, a color reproduction area Sv that is similar to a color reproduction area of the output device 103, from among the color reproduction areas stored in the first storage unit 210. The gamut compressing unit 250 compresses and maps color data to a color reproduction range of an output device (printer) by referring to information on the virtual color reproduction area Sv selected by the color reproduction area selecting unit 230 and the information stored in the second storage unit 220. The second color converting unit 260 converts a color signal, converted by the gamut compressing unit 250, to a control signal (CMY or CMYK) of a printer.

The color reproduction area selecting unit 230 only evaluates a color difference, without determining whether the defining colors (R, G, B, C, M, and Y) of the color reproduction area information are inside or outside the virtual color reproduction area. Thus, selection is made for a virtual color reproduction area that is in average similar in shape to the color reproduction area. The color difference may be a mean color difference or a maximum color difference of the six colors.

The following describes the operation of the gamut compressing unit 250. In the third embodiment, a compressed vector is determined by referring to color reproduction target values corresponding to the virtual color reproduction area Sv, and color data is directly mapped to the color reproduction area of the output device. In the example of FIG. 12, an input color S is mapped to an output color P lying on a line connecting the input color S and a target color A. When the input color is within the color reproduction area of the output device, the color is faithfully reproduced without being compressed.

Figure 14:
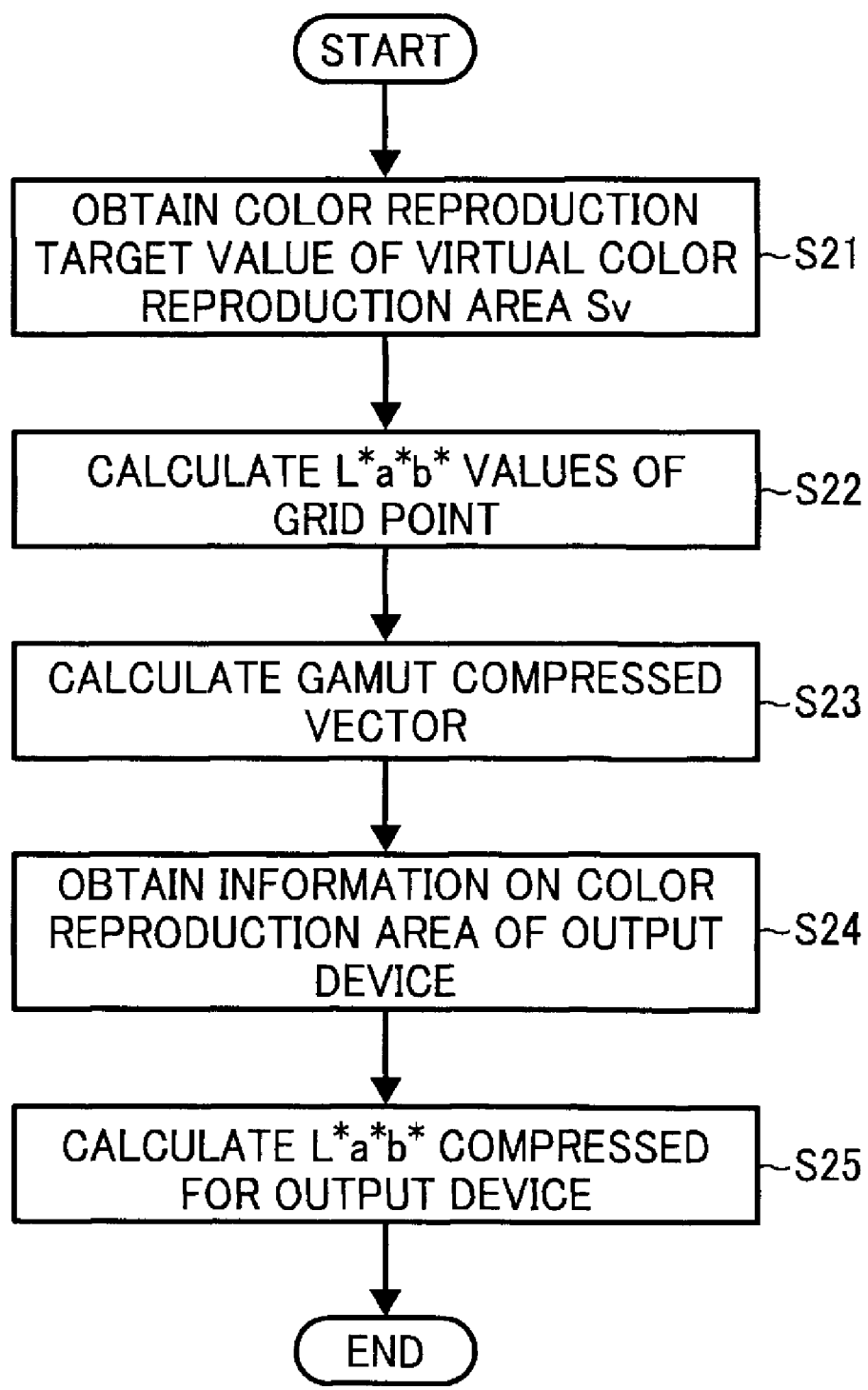
FIG. 14 is a flowchart of a gamut compressing process according to the third embodiment.

FIG. 14 is a flowchart of the operation of the gamut compressing unit 250. At step S21, by reading out a color profile corresponding to the virtual color reproduction area Sv, a color reproduction target value is obtained. As the color reproduction target values, L*a*b* values corresponding to a grid point in the input RGB color space are described in the form of a 3D-LUT.

At step S22, L*a*b* values corresponding to a grid point Gi (r, g, b) are found. For example, when an input RGB signal is an sRGB signal, L*a*b* values can be calculated by Equation 1 as follows:

when $R/255 \leq 0.03928$, $R_{sRGB} = R/255/12.92$ when $R/255 > 0.03928$, $R_{sRGB} = ((R/255 + 0.055)/1.055)^{2.4}$ when $G/255 \leq 0.03928$, $G_{sRGB} = G/255/12.92$ when $G/255 > 0.03928$, $G_{sRGB} = ((G/255 + 0.055)/1.055)^{2.4}$ when $B/255 \leq 0.03928$, $B_{sRGB} = B/255/12.92$ when $B/255 > 0.03928$, $B_{sRGB} = ((B/255 + 0.055)/1.055)^{2.4}$ $$\begin{bmatrix} x \\ y \\ z \end{bmatrix} = \begin{bmatrix} b11 & b12 & b13 \\ b21 & b22 & b23 \\ b31 & b32 & b33 \end{bmatrix} \begin{bmatrix} R_{sRGB} \\ G_{sRGB} \\ B_{sRGB} \end{bmatrix}$$

$[X] = [b11 b12 b13][R_{sRGB}]$ $[Y] = [b21 b22 b23][G_{sRGB}]$ $[Z] = [b31 b32 b33][B_{sRGB}]$ $L^* = 116(Y/Yn)^{1/3} - 16)$ $a^* = 500((X/Xn)^{1/3} - (Y/Yn)^{1/3})$ $b^* = 200((Y/Yn)^{1/3} - (Z/Zn)^{1/3})$

At step S23, a gamut compressed vector is calculated. The gamut compressed vector is a vector connecting a grid point Gi(li, ai, bi) and a target reproduction color Pi(lt, at, bt) allocated for the grid point, and is represented as (lt−li, at−ai, bt−bi).

At step S24, the color reproduction area information Sd is obtained by accessing the second storage unit 220.

At step S25, an input signal is subjected to gamut compression to be converted to data within the color reproduction area of the output device. By the gamut compression, input data within the color reproduction area of the output device is faithfully reproduced. Input data outside the color reproduction area of the output device is compressed in a direction of the vector calculated at step S23, and mapped to an intersection with a gamut border of the output device.

With the above processes, a 3D-LUT for converting input RGB values to Lab values of the output device can be established. This allows use of an interpolation calculation for color conversion of image data.

As such, even when the color reproduction area of the output device is partially larger than the virtual color reproduction area, color reproduction is realized utilizing color reproduction capability of the output device. The processes performed by the second color converting unit after the gamut compression are the same as those described in the first embodiment.

Figure 15:
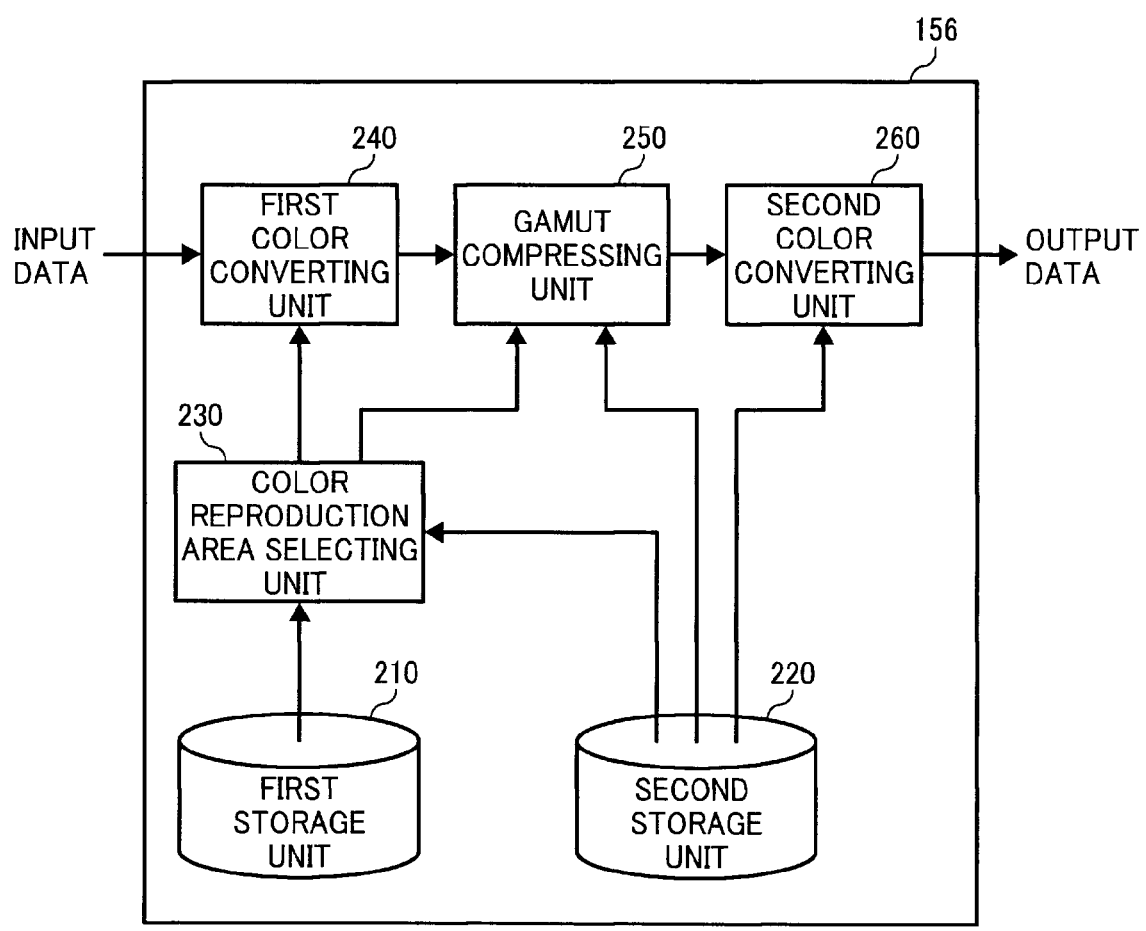
FIG. 15 is a block diagram of a color converting device according to a fourth embodiment of the present invention.

In the above embodiments, color conversion is performed by using color reproduction target values of only one virtual color reproduction area. The color conversion can also be performed by referring to color reproduction target values of a plurality of virtual color reproduction areas. FIG. 15 is a block diagram of a color converting device 156 according to a fourth embodiment of the present invention. The color converting device 156 is of basically the same configuration and operates in a similar manner as previously described in connection with FIG. 2 except that the gamut compressing unit 250 maps a color gamut using two kinds of virtual color reproduction area information selected by the color reproduction area selecting unit 230, and characteristic data of an output device.

Figure 16:
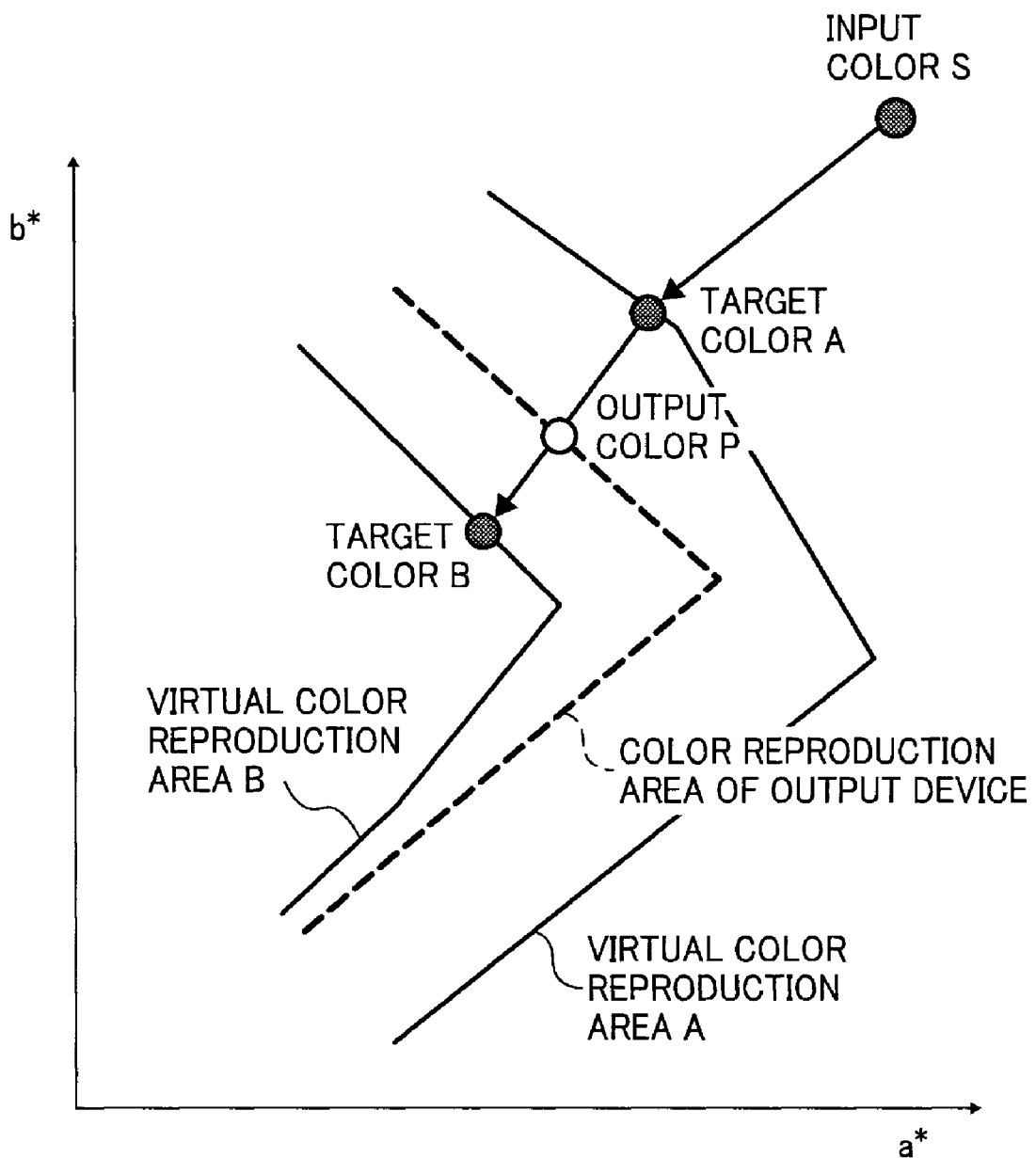
FIG. 16 is a schematic diagram for explaining gamut compression according to the fourth embodiment.

Referring to FIG. 16, the following describes gamut compression using color reproduction target values of a plurality of virtual color reproduction areas. In the fourth embodiment, two virtual color reproduction areas having different sizes (virtual color reproduction areas A and B) are selected, and gamuts of the areas are mapped to an output color lying on a line connecting a target color A and a target color B respectively set in the virtual color reproduction areas. The virtual color reproduction area A covering the color reproduction area of the output device, and the color reproduction area B included in the color reproduction area of the output device are selectively used in general. For example, the virtual color reproduction area described in the third embodiment can also be used as the virtual color reproduction area B.

In the first embodiment, the color converting device 106 retains the virtual color reproduction information. In a fifth embodiment of the present invention, a computer sends a plurality of pieces of virtual color reproduction information to the output device, and the output device processes the virtual color reproduction information.

Figure 17:
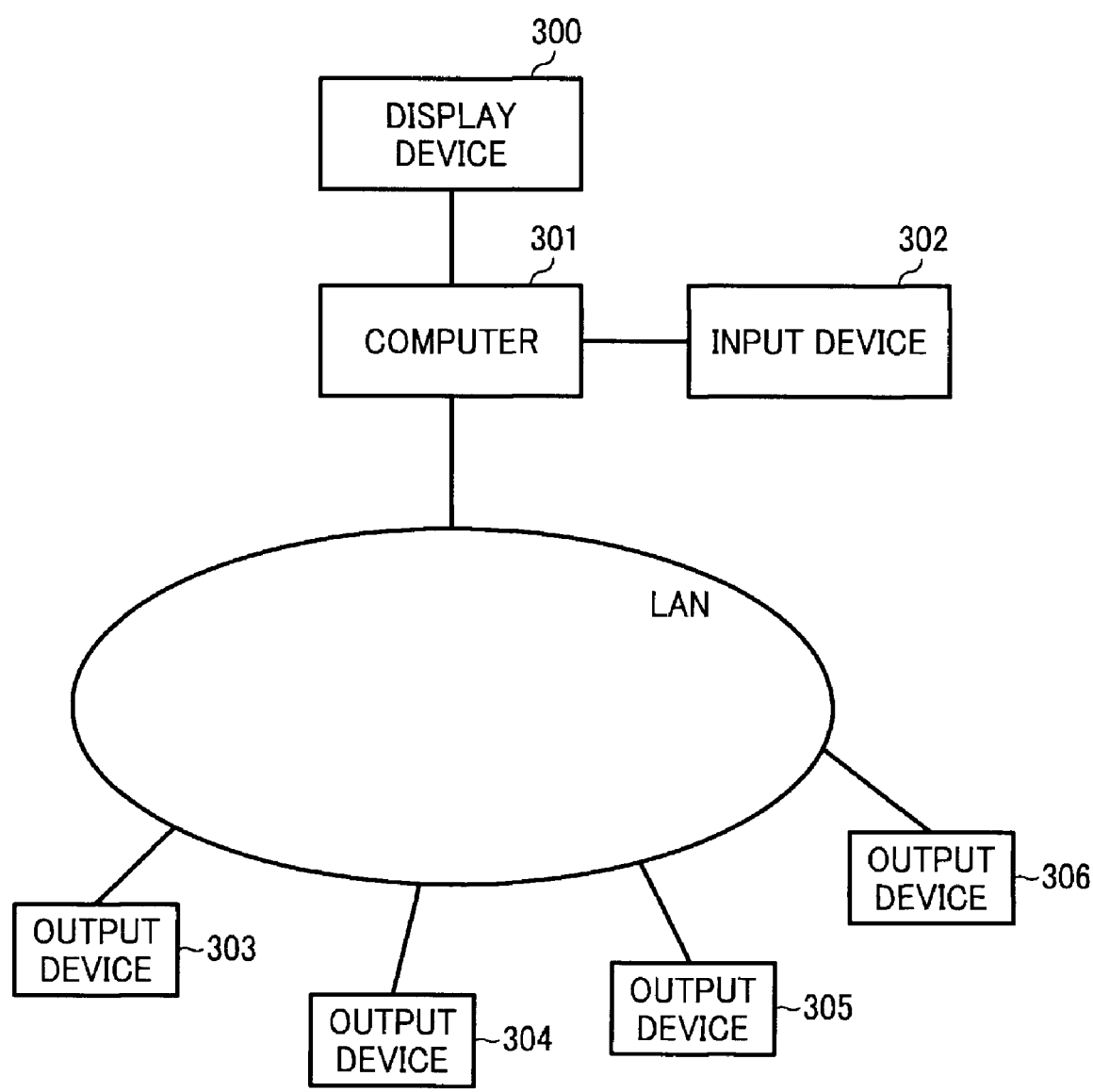
FIG. 17 is a schematic diagram of a color conversion system according to a fifth embodiment of the present invention.

FIG. 17 is a schematic diagram of a color converting system according to the fifth embodiment. A plurality of output devices 303 to 306 are coupled to a network, and a computer 301 outputs image data to a specific output device as necessary. The computer 301 is connected to a display device 300 and an input device 302. The computer 301 reads image data via the input device 302 and sends it to a certain output device.

In the color converting system, the computer 301 serves to add an ICC profile to the image data thus read out, and sends them to the output device.

FIG. 18 depicts a data format of a typical ICC profile. The ICC profile, standardized in a data format as shown in FIG. 18, includes a header section, a Tag table indicating a position where Tag data is located, and Tag data (substantial portion of the Tag data) as shown in FIG. 18. In the header section, a name of a color management module (CMM) (color converting engine) in use, a device type, a standard signal type, and a profile type are described. The profile type is described as code data of an image generating device that generates image data, such as "scnr" for a scanner serving as the image generating device, and "mntr" for an image display (display) serving as the image generating device.

In the Tag portion (Tag table and Tag data), various additional data related to color conversion can be set in detail as necessary. Color conversion parameters for converting a device signal to a standard signal such as an XYZ or an Lab signal are also described as the Tag data.

As the color conversion parameters, a related-art ICC profile can have only A2B0 Tag, A2B1 Tag, and A2B2 Tag. These three kinds of parameters are for use in different gamut compression methods, and applied to the same color reproduction area. The fifth embodiment uses an ICC profile that is expanded to hold color conversion parameters corresponding to a plurality of color reproduction areas.

For example, to use four virtual color reproduction areas, a profile having four kinds of A2BX Tag is created in advance. The computer 301 sends the profile during output of image data, while the output device determines a color conversion tag corresponding to a color reproduction area that is most similar to the color reproduction area of the output device. As a result of the determination, a 3D-LUT for converting a set of input R, G, and B values to a color signal of the output device is established by using a color conversion tag of the selected input profile and an ICC profile of the output device. In the fifth embodiment, because the output device can control color reproduction, intended color reproduction is realized even when a color signal is output to output devices (printers) of various types having different color reproduction ranges.

The above embodiments describe color processing performed by selecting a virtual color reproduction range that is close to the color reproduction range of the output device, from among a plurality of virtual color reproduction ranges. The third embodiment proposes a method for determining a mapping direction by using a color reproduction target of the selected virtual color reproduction range.

In the following embodiments, color processing is performed by using a standard color reproduction range created by a predetermined calculation. An improved gamut processing is also proposed.

Figure 19:
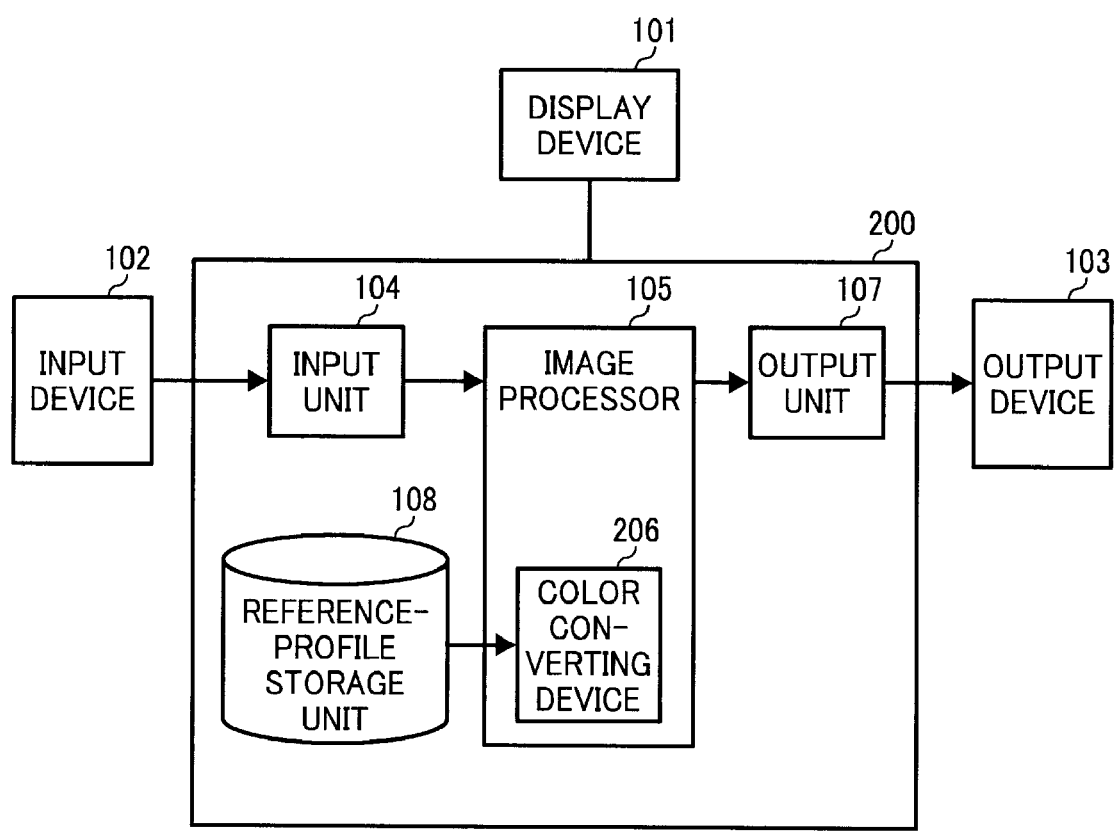
FIG. 19 is a block diagram of an image processing system according to a sixth embodiment of the present invention.

FIG. 19 is a block diagram of an image processing system according to a sixth embodiment of the present invention. The image processing system of the sixth embodiment includes an image processing apparatus 200. The image processing apparatus 200 is basically similar in configuration to the image processing apparatus 100 except for a reference-profile storage unit 108. The color converting device 106 performs color conversion process by reading out, from the reference-profile storage unit 108, a reference profile corresponding to the type of image data.

Figure 21:
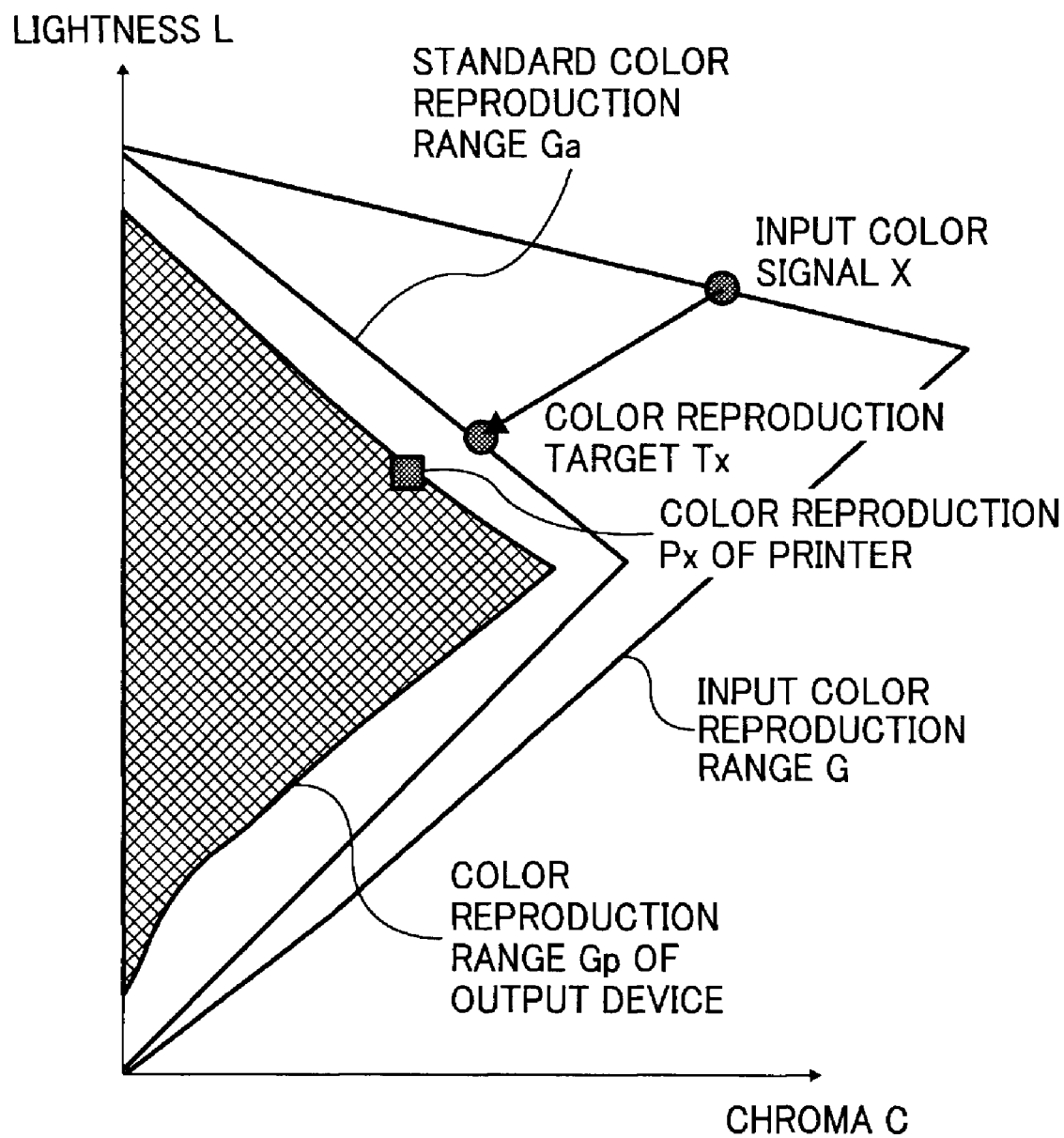
FIG. 21 is a schematic diagram for explaining color reproduction ranges according to the sixth embodiment.

In the sixth embodiment, by using color reproduction target values described in the reference profile for color reproduction, colors reproduced by various output devices are equalized. Referring to FIG. 21, the following describes the concept of such color reproduction. FIG. 21 depicts an input color space G, a standard color reproduction range Ga, and a color reproduction range Gp of a printer on a surface of the same hue. For an input color signal X, a target color Tx is defined on a standard color reproduction range, and the output devices have different color reproduction ranges depending on their device types. The output device shown in FIG. 21 cannot reproduce the target color Tx because the target color Tx is outside the color reproduction range of the device. Thus, the color is reproduced (at Px indicated in FIG. 21) to match the target color Tx as much as possible. By reproducing the color based on the color reproduction target, relatively equalized colors are reproduced by a plurality of output devices.

Described below is a method of creating a reference profile. The reference-profile storage unit 108 stores therein a plurality of reference profiles that describe color reproduction target values corresponding to standard color reproduction ranges created in advance. The image processor 105 sends to the color converting device 106 a reference profile that matches an object type of input image data or a print output mode of the input image data. Examples of the object type include a bitmap image, graphics, and text.

A reference profile describes, for example, a 3D-LUT defining color values (JCaCb values or L*a*b* values in a CIECAM02 space) of a target color for an n×n×n grid point in the input RGB space. The reference profile can be provided in the form of, for example, an ICC profile.

Such reference profile is created in advance before color conversion process (described later). A process for creating the reference profile includes determining a standard color reproduction range Ga, and then determining a target reproduction color T for the standard color reproduction range.

Described below is a specific example of the process of determining a standard color reproduction range. In the sixth embodiment, the standard color reproduction range is determined to be as similar as possible to that of an output device with regard to size and shape. If the standard color reproduction range is too large, the target reproduction color significantly deviates from a color reproduced by the output device, causing a large fluctuation in color reproduction depending on device types. Thus, the standard color reproduction range is created to have an average size for existing output devices.

A color reproduction range of an output device normally has a curved surface configuration, not a flat surface. In the sixth embodiment, to define a color reproduction range having such curved surface configuration, modeling of a virtual device is performed using a physics model.

The physics model is a model formula that enables calculation of a reproduced color upon superimposition of C, M, and Y inks, by computer simulation based on virtual color characteristics of the C, M, Y inks. As the model formula, Neugebauer model, Yule-Nielsen model that is a modification of the Neugebauer model, and other models can be used. As an example, the Yule-Nielsen model is employed in the sixth embodiment.

Figure 22:
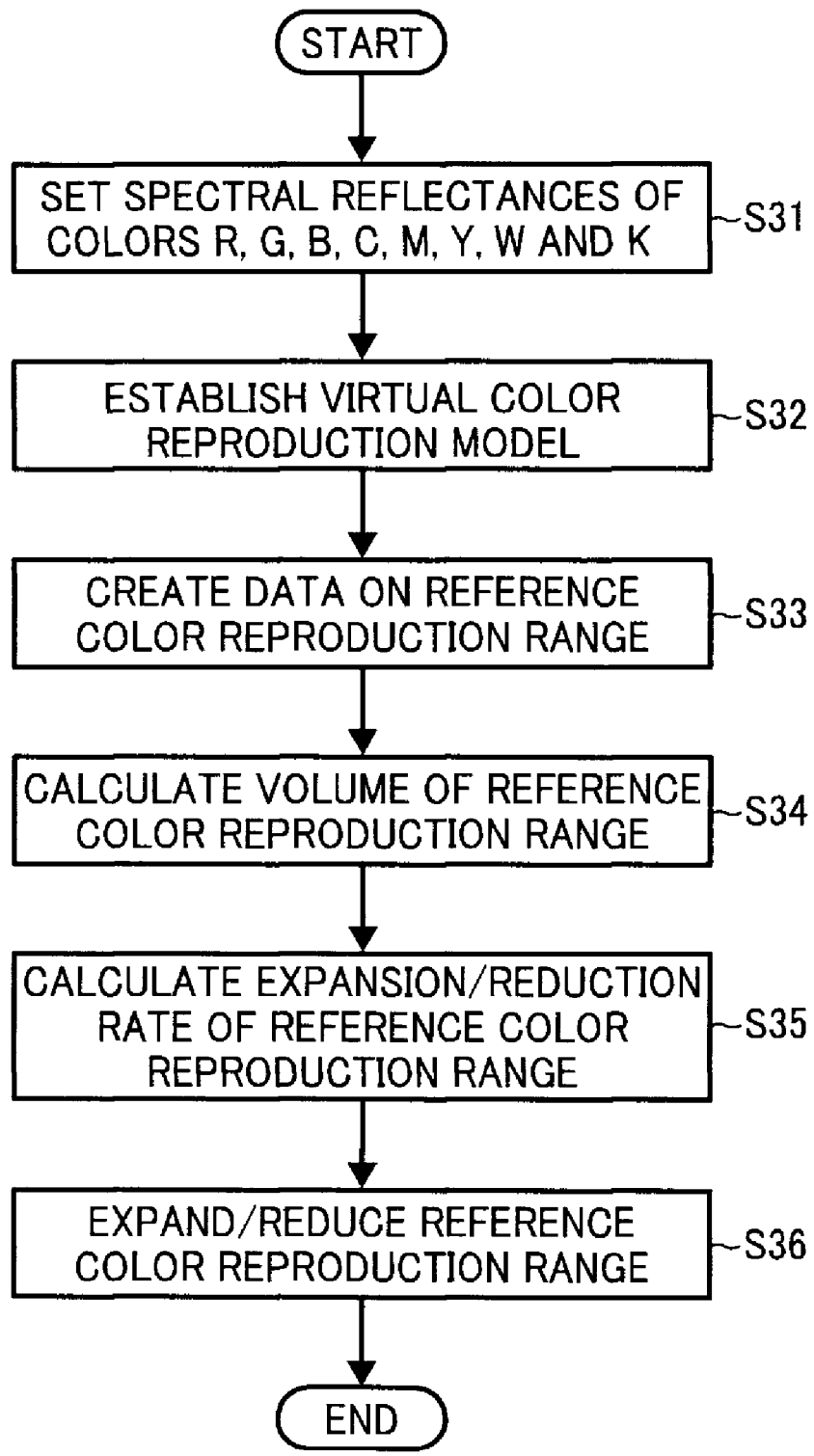
FIG. 22 is a flowchart of a process for creating a standard color reproduction range.

FIG. 22 is a flowchart of a process for creating the standard color reproduction range Ga.

Figure 23:
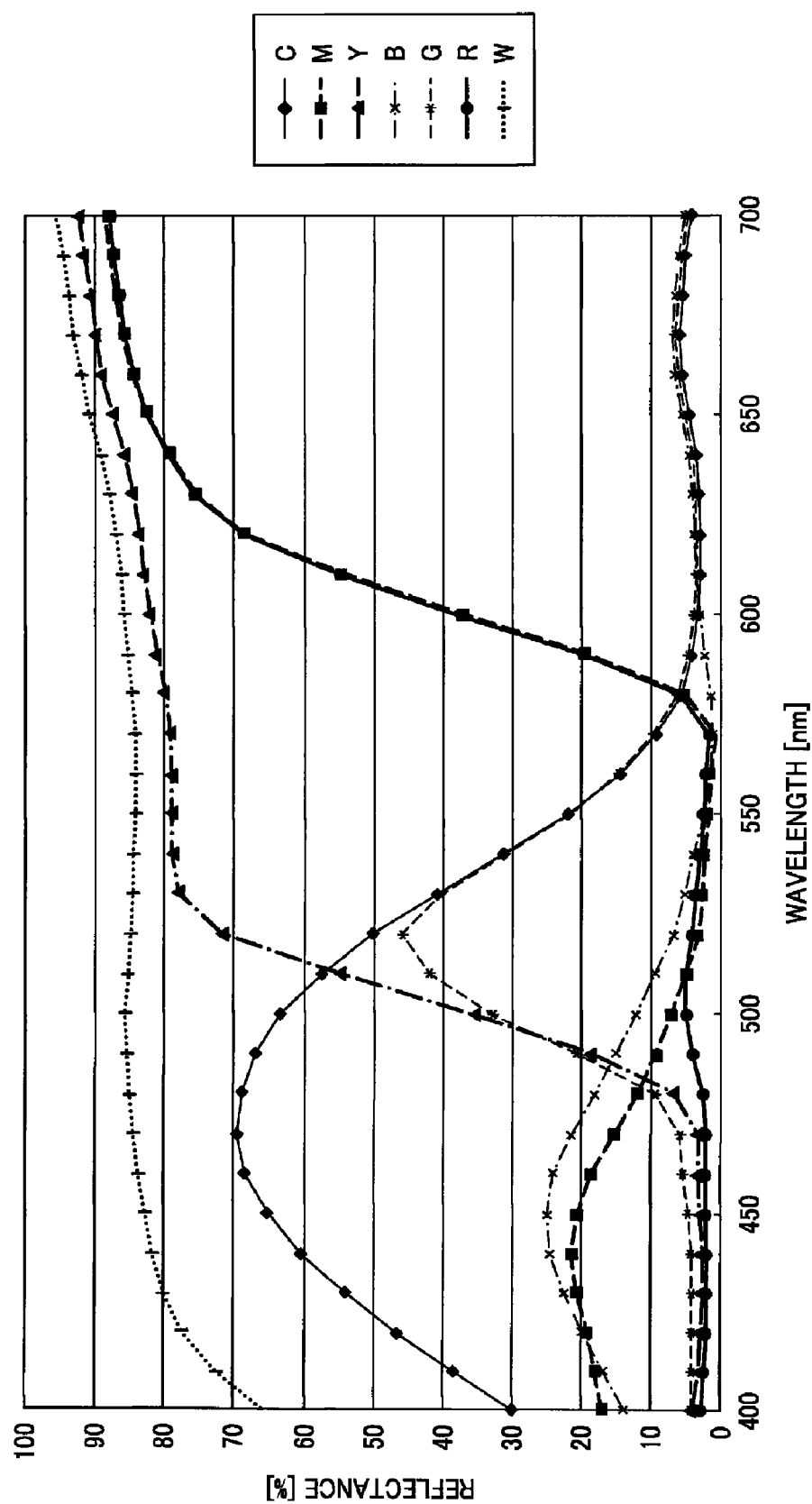
FIG. 23 is an graph of examples of spectral reflectance of solid colors.

At step S31, spectral reflectances of basic eight solid colors R, G, B, C, M, Y, W, and K are set. For example, the spectral reflectances can be defined by measuring spectral reflectances of the solid colors of a plurality of printers that seek unified color reproduction, and then by averaging the spectral reflectances in each wavelength. In this way, typical spectral reflectances can be defined. Alternatively, data on spectral reflectances of solid colors of a commercially standard printer such as JapanColor can be used. FIG. 23 depicts examples of spectral reflectance. To finely adjust the basic eight colors, spectral reflectances of measured colors can be manually corrected.

After setting the spectral reflectances of the solid colors, a virtual color reproduction model is established at step S32. The virtual color reproduction model describes device characteristics in a mathematical model, as typified by Yule-Nielsen Neugebauer model for example.

The Yule-Nielsen Neugebauer model is expressed by the following equation:

$$R(\lambda)=pow(\Sigma Ki \cdot pow(Ri(\lambda),1/n),n)$$

where $R(\lambda)$ is a reflectance of a mixed color in a wavelength $\lambda$ (nm), $Ri(\lambda)$ is a reflectance of a solid color i, to which the data on the spectral reflectances of the basic eight colors set at step S31 is applied, and n is an adjustment parameter, called Yule-Nielsen n value. The n value is not necessarily determined strictly and may be set between about 1.0 and about 2.5, because varying the n value does not largely affect the gamut shape. Further, Ki is an area ratio of the solid color i and set between 0.1 and 1.0.

At step S33, data on the reference color reproduction range Gs is created with the color reproduction model. The reference color reproduction range Gs is created with the color reproduction model, by finding data (JCH values, etc.) in a CIECAM02 space for a grid point on a cubic surface in the CMY space. As the grid point of a cubic surface, output values in a combination of C, M, and Y components two of which are 0 or 1 can be used.

Specifically, data on the color reproduction range can be created by calculating JCaCb values (color values in the CIECAM02 space) of a mixed color of cyan, magenta, and yellow having varied tone values, and then by finding a color on the outermost line of the color reproduction range.

Area ratios Kc, Km, Ky, Kr, Kg, Kb, Kw, and Kk of C, M, Y, R, G, B, W, and K in a mixed color patch are found by the following Demichel equations:

$$Kc=kc(1-km)(1-ky)$$

$$Km=(1-kc)km(1-ky),$$

$$Ky=(1-kc)(1-km)ky$$

$$Kr=(1-kc)kmky$$

$$Kg=kckm(1-ky)$$

$$Kb=kc(1-km)ky$$

$$Kw=(1-kc)(1-km)(1-ky)$$

$$Kk=kckykm$$

where kc is a tone value of cyan, km is a tone value of magenta, and ky is a tone value of yellow. Further, by applying the Kc, Km, Ky, Kr, Kg, Kb, Kw, and Kk to the color reproduction model created at step S32, a spectral reflectance of the mixed patch can be calculated. Specifically, to find a standard color reproduction range, a spectral reflectance of the mixed color is calculated by varying the tone values of kc, km, and ky at a predetermined interval ranging from 0.0 to 1.0, not by varying the Kc, Km, Ky, Kr, Kg, Kb, Kw, and Kk.

After the calculation for the spectral reflectance of the mixed color, XYZ tristimulus values are calculated and converted to JCaCb values in the uniform color space. The conversion from the XYZ tristimulus values to the JCaCb values is performed by using a conversion formula described in CIE Publication 159:2004.

The above method enables calculation of JCaCb values that correspond to a grid point on a CMY color cubic, thereby determining the reference color reproduction range Gs.

Figure 24:
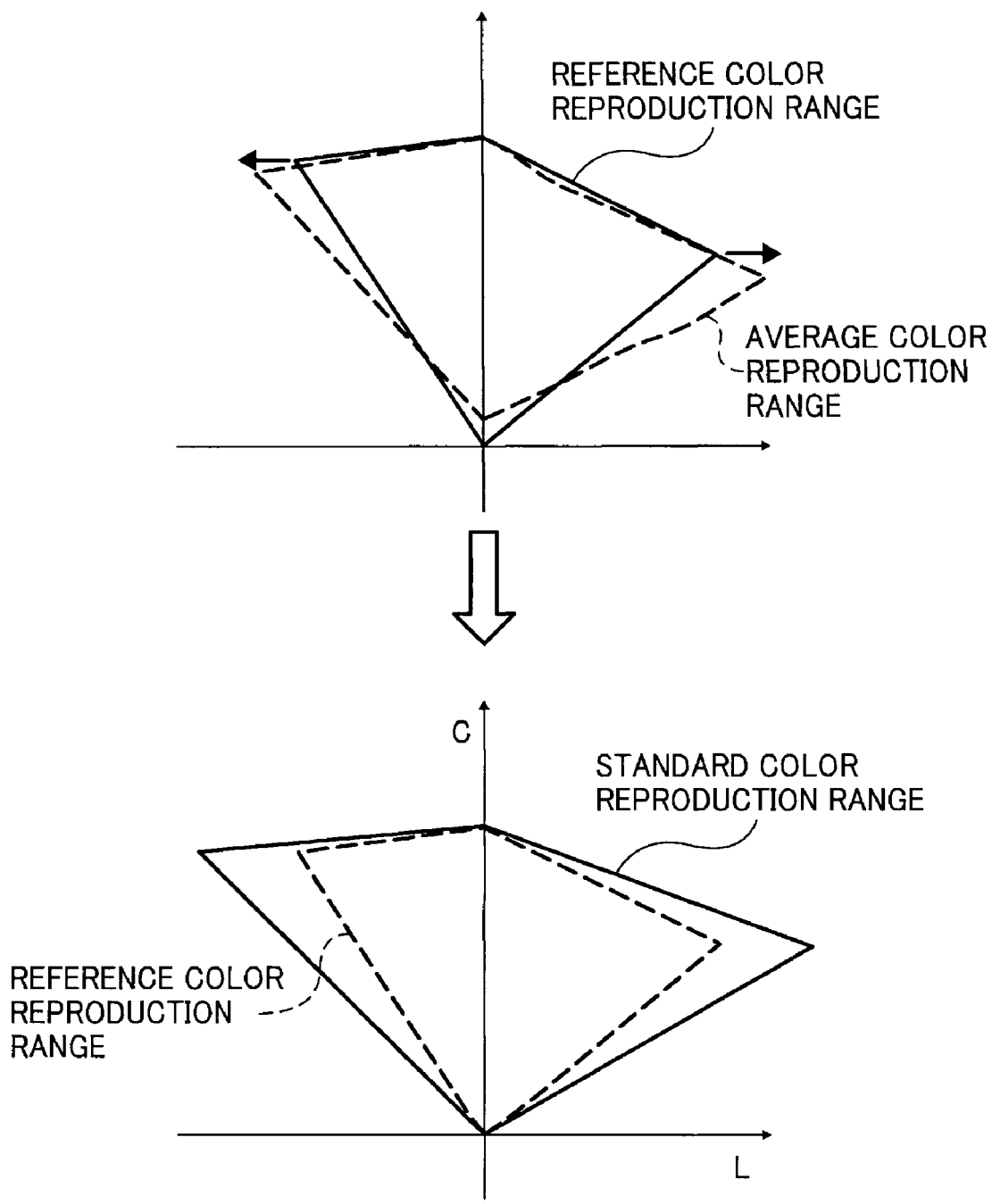
FIG. 24 is a schematic diagram for explaining a process for expanding/reducing a reference color reproduction range.

The reference color reproduction range is expanded/reduced so that the standard color reproduction range substantially matches the average color reproduction range of the output devices in size (FIG. 24).

At step S34, a volume of the reference color reproduction range is calculated. Because the color reproduction range can be regarded as an assembly of many tetrahedral bodies, the total volume can be calculated by finding a sum volume of the tetrahedral bodies. The volume of a tetrahedral body can be calculated by Heron's formula, and detailed explanation thereof is omitted.

By calculating volumes of the color reproduction ranges of the output devices with the same method, an average volume is calculated in advance. A volume V(Gs) of the standard color reproduction range, and a volume V(Gp) of the average color reproduction range of the output devices are calculated, and then at step S35, an expansion/reduction rate R for the reference color reproduction range Gs is calculated. The expansion/reduction rate R can be calculated readily by the following equation:

$$R=\sqrt{(V(Gp)/V(Gs))}$$

Finally at step S36, by expanding or reducing the reference color reproduction range Gs with the expansion/reduction rate, a standard color reproduction range Ga for setting a target reproduction color is created.

The above method enables creation of the standard color reproduction range Ga that has a smooth curved surface shape being similar to the gamut shape of an output device. In the above example, the standard color reproduction range is determined to have a volume equal to the average volume. The color reproduction range of the virtual color reproduction model, established by averaging the spectral reflectances in each wavelength, can also be used as the standard color reproduction range.

A target reproduction color T described in a reference profile is held in the form of a 3D-LUT in which color values (=JCaCB values) in the CIECAM02 space are defined corresponding to an n×n×n grid point in the input RGB space. The target reproduction color T is created by performing any gamut processing including manual adjustment on the standard color reproduction range Ga. For the gamut processing, various methods can be used depending on use or mode of compression, such as compression methods giving emphasis on holding tones, or compression methods allowing a minimum color difference.

Figure 20:
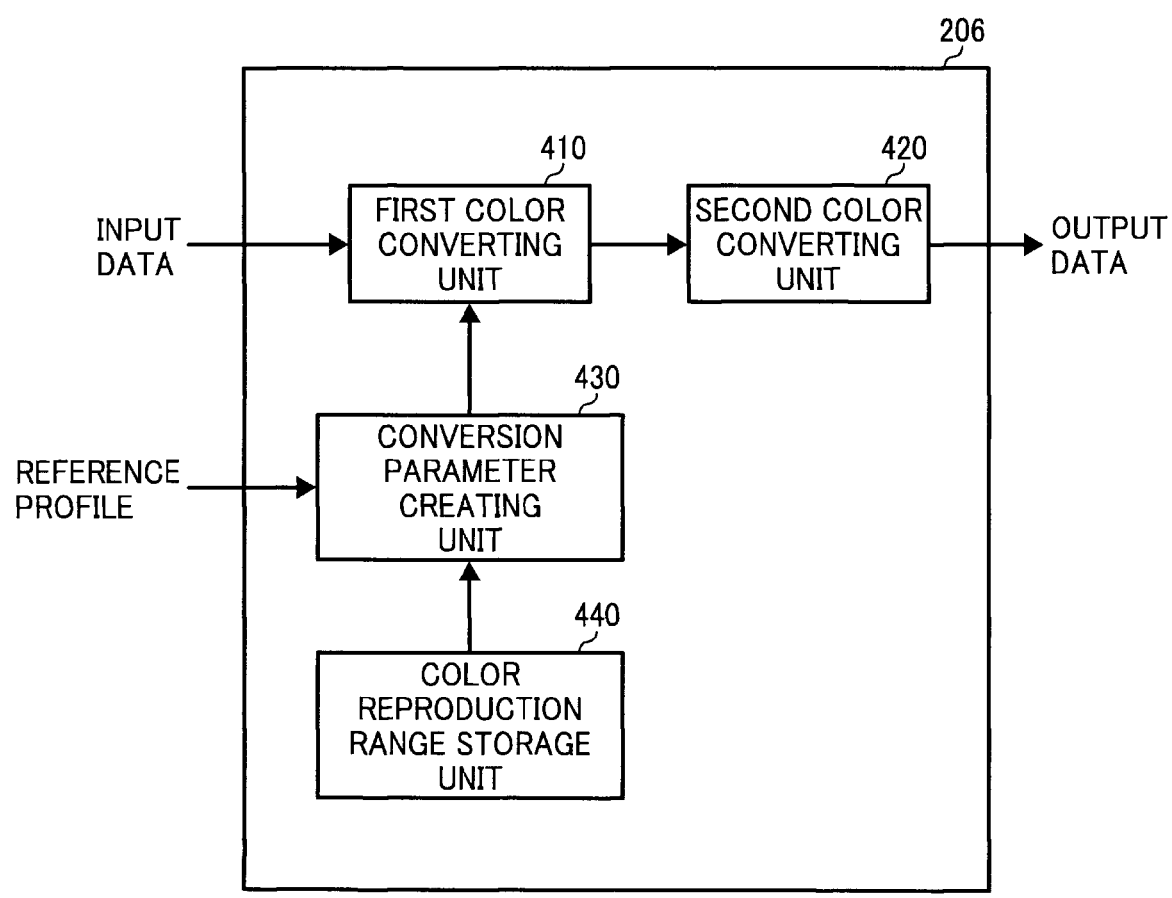
FIG. 20 is a schematic diagram of a color converting device shown in FIG. 19.

FIG. 20 is a schematic diagram of a color converting device 206. The color converting device 206 includes a first color converting unit 410, a second color converting unit 420, a conversion parameter creating unit 430, and an color reproduction range storage unit 440. The first color converting unit 410 converts an input color signal to a device independent color signal within a color reproduction range of an output device. The second color converting unit 420 converts the device independent color signal converted at the first color converting unit 410 to a control signal (CMY or CMYK) of an output device, and outputs the signal. The conversion parameter creating unit 430 creates, by referring to a reference profile read from the reference-profile storage unit 108, color conversion parameters to be used by the first color converting unit 410. The color reproduction range storage unit 440 stores therein data on color reproduction ranges of output devices.

A device dependent input color signal input to the color converting device is specifically RGB gradation data. A typical gradation level of each color component is eight bits=256, and can be other gradation levels such as 64 and 512. A CIECAM02 space is used for a device independent color signal, as is the case for a reference profile.

The following describes specific operations performed by processors in the color converting device 206. The color reproduction range storage unit 440 stores therein data that describes color reproduction ranges of output devices as exemplified by FIG. 25. As shown in FIG. 25, the data is presented by: identification (IDs) of polyhedral bodies (polygons) that cover a surface of a color gamut at predetermined hue and lightness; a list of peak points configuring the polygons; coordinate values of the peak points in an output color space; and coordinate values of the peak points in a device independent color space. In the example of FIG. 25, lightness is divided into 10, and hue is divided into 12 by 30 degrees in the device independent color space, and IDs of polygons that belong to each segment of the divided lightness and hue are described. ID numbers of the peak points configuring the polygons are registered in a separate list. Further, the ID numbers of the peak points are associated with C, M, Y, J, Ca, and Cb data. To precisely describe a color reproduction area of an output device (printer), the lightness and the hue are divided into the larger number of segments.

By preparing such information on the color gamut in advance, high speed access can be made to a polygon to be searched for performing gamut processing on an input signal.

The above example uses the peak point list and the polygon list as data configuration representing polygons. Any data configuration can be used that represents a target color gamut. For example, each polygon can be represented directly by coordinates of three peak points, without providing the peak point list and the polygon list separately.

The conversion parameter creating unit 430 creates, by referring to a reference profile, color conversion parameters to be used by the first color converting unit 410. The color conversion parameters are represented by a 3D-LUT for converting grid point data in the input RGB space to chroma values within a color reproduction range of an output device.

Figure 26:
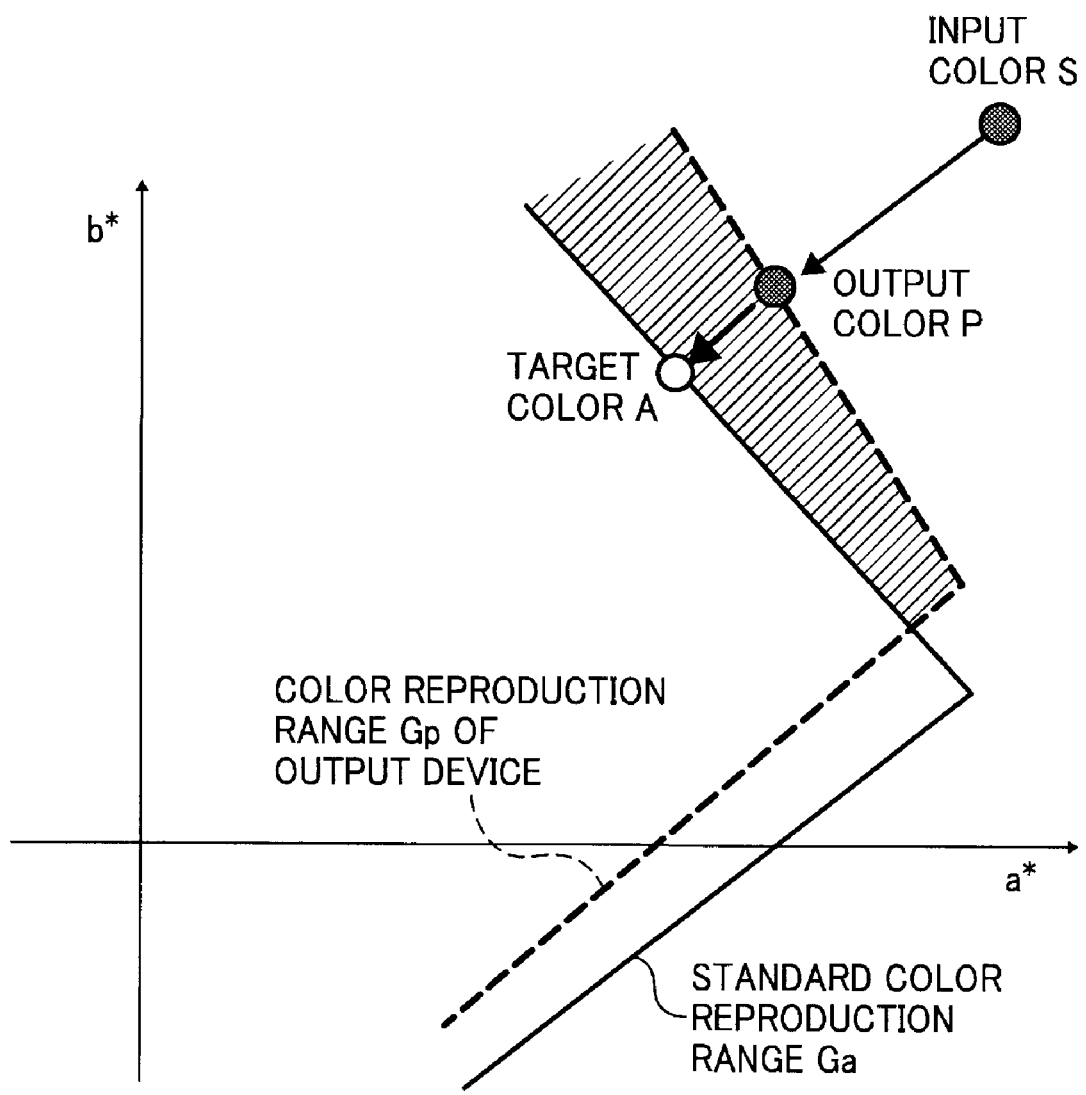
FIG. 26 is a schematic diagram for explaining a relation between a standard color reproduction range and a color reproduction range of an output device.

The following is an explanation with reference to FIG. 26 of a characteristic feature of gamut processing according to the sixth embodiment. FIG. 26 depicts an enlarged portion of an a*b* plan view of a standard color reproduction range and a color reproduction range of an output device. The standard color reproduction range Ga has an average size of color reproduction ranges of a plurality of output devices, and therefore the standard color reproduction range Ga is partially smaller than the color reproduction range Gp of the output device (shaded portion in FIG. 26).

The target color A is reproducible by the output device. However, if an input color S is reproduced at the target color A, colors in the shaded portion are not used, failing to fully utilize the color reproduction capability of the output device. In the sixth embodiment, when the standard color reproduction range is partially smaller than the color reproduction range of the output device, high chroma colors outside the standard color reproduction range are actively used to give good impression in reproduced colors.

Figure 27:
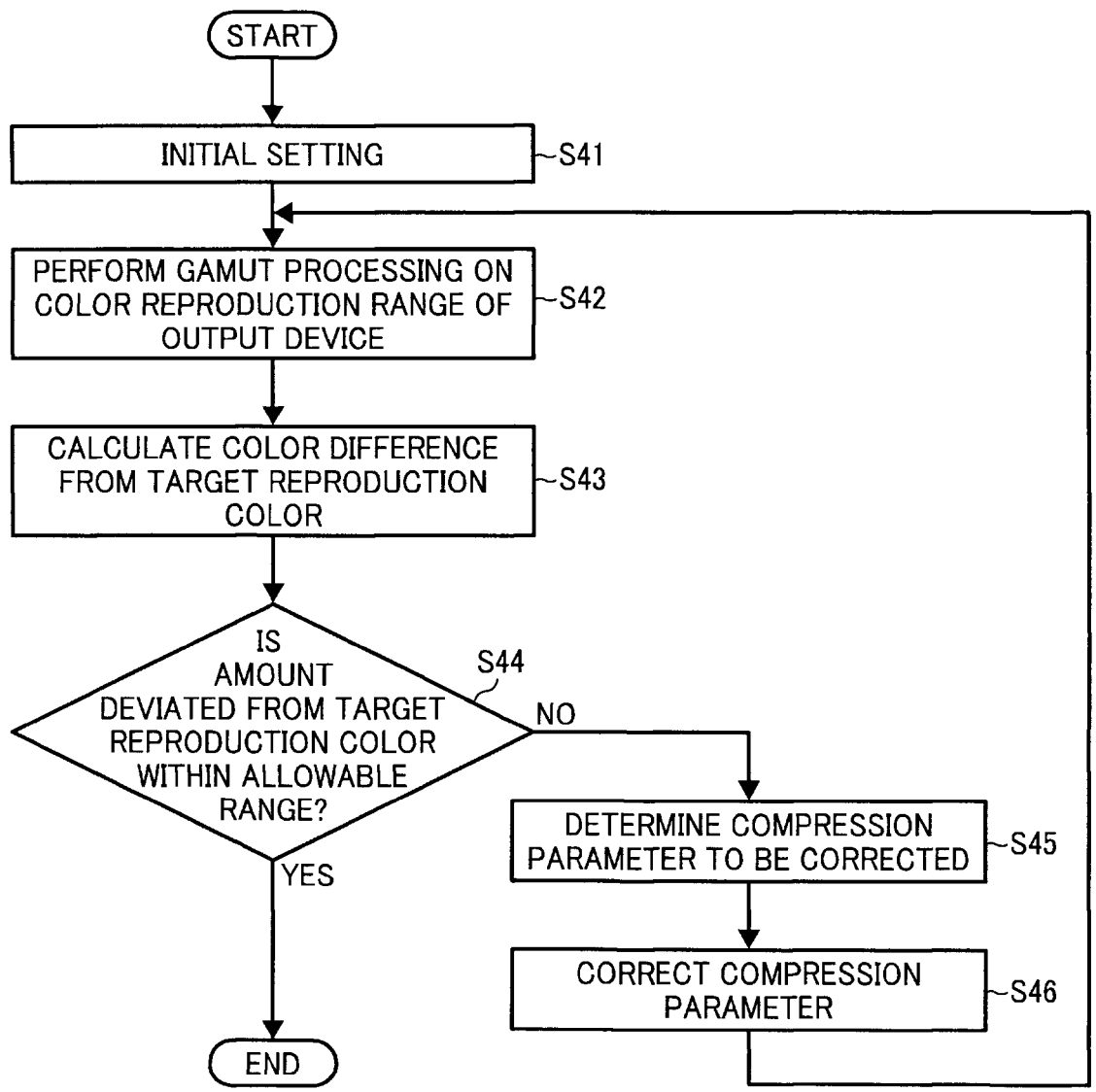
FIG. 27 is a flowchart of a process for creating a gamut processing parameter according to the sixth embodiment.

Specifically, by referring to the relation between the input color S and the target color A, gamut processing is performed directly from the input color S to the color reproduction range of an output device as shown in FIG. 27.

FIG. 27 is a flowchart of a process for creating a gamut processing parameter according to the sixth embodiment. At step S41, the initial setting is performed. Specifically, by reading out the 3D-LUT from a reference profile, RGB values of a grid point and color reproduction target values thereof are set in memory.

At step S42, gamut processing is performed on data of all grid points by using initial values of gamut process parameters to find JCaCb values within the color reproduction range of the output device. For the gamut processing, various methods can be used as exemplified by the following method.

Figure 28:
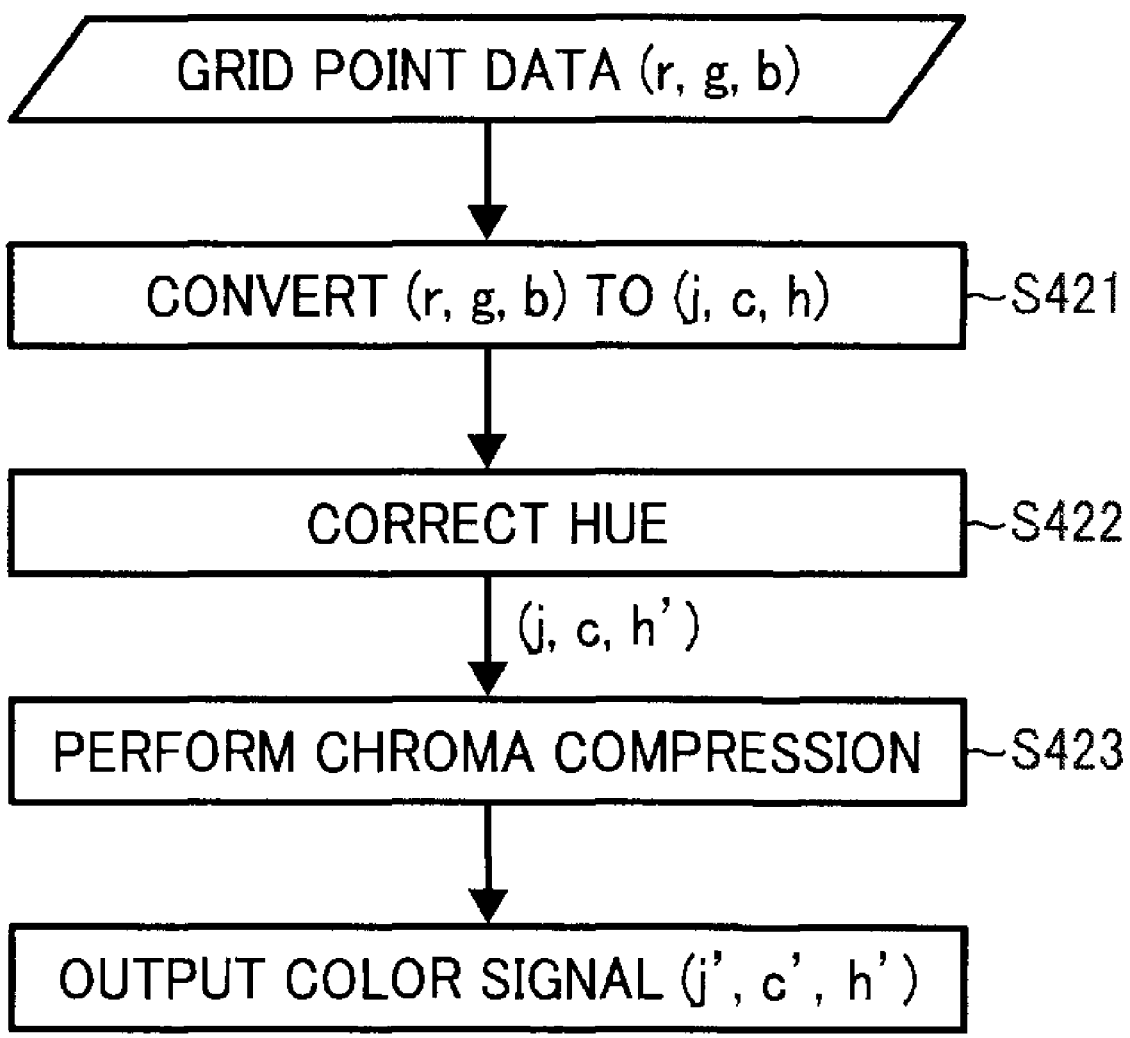
FIG. 28 is a flowchart of gamut processing according to the sixth embodiment.

Referring to FIGS. 28 and 29, the following describes specific gamut processing. At step S421, color signal values [r, g, b] of a grid point Xi are converted to a color signal Pi (j, c, h) based on lightness J, chroma C, and hue H in the CIECAM02 space.

At step S422, the hue h of Pi (j, c, h) is corrected to h'. The hue correction serves to convert a high chroma color appearing distinctive in color change to another color appearing indistinctive in color change. As a table for such hue correction, a one-dimensional lookup table can be established for converting the hue h of an input signal to hue h'.

At step S423, by referring to gamut data on the output device, chroma compression is performed at a constant hue to find an output color signal Po (j', c', h').

Because Pi and Po are on the same hue, the chroma compression is considered as two-dimensional conversion from Pi (j, c) to Po (j', c'). Specifically, by finding an intersection between a straight line connecting Pi and a point M in the color reproduction range of a printer, and a boundary surface of the output device, the color can be compressed to a point lying on the border of the color reproduction range. Such gamut compression method can be realized by a known calculation method (as disclosed in Japanese Patent No. 3171081).

Referring back to FIG. 27, at steps S43 and S44, by finding a deviation amount between a target reproduction color T and a reproduced color Po of an output device found in the gamut processing at step S42, evaluation is made on whether the target reproduction color has been reflected appropriately. The deviation amount is most simply obtained by finding a color difference between the target reproduction color T and the reproduced color Po. However, if the color reproduction range of the output device is fully utilized also in an area exceeding the standard color reproduction range, a larger color difference is caused contradictly. For this reason, the following equation is used for color difference correction:

$$EM=\Delta(P,T)\times(\Delta s(X,P)-\Delta s(X,T))$$

where P is a reproduced color of the output device, T is a target color, X is an input color, $\Delta(x,y)$ is a color difference between colors x and y, and $\Delta s(x,y)$ is a chroma difference between the colors x and y. If the reproduced color P has a higher chroma than the target color T based on the equation, determination is made that the color difference formula EM gives a negative value and therefore the color difference is small.

After finding the deviation amount, determination is made at step S44 on whether the deviation amount of the reproduced color P of the output device falls within an allowable range of the target color reproduction. As the allowable range, for example, an upper limit value for the color difference formula can be set in advance. Further, such upper limit value can be changed for each color. For example, an allowable value can be set more strictly for colors, such as gray and skin color, which are sensitively perceived by the human eye.

If the deviation amount falls within the range of such allowable value, the gamut processing is terminated. If the deviation amount exceeds the allowable value, at step S45, determination is made for mapping parameters to be corrected for the gamut processing. In this gamut processing, the mapping parameters to be corrected include a correction value for the hue correction, and a compression direction for chroma compression.

The mapping parameters are corrected as the following preference order. A hue correction parameter that affects color reproduction in a large range is optimized, and then compression directions for target colors are optimized one by one. As to which hue value should be first corrected from among hue correction parameters, the hue having such a large color difference is corrected first. After determining the parameters to be corrected, the parameters are corrected, and steps S42 to S46 are repeated until the corrected values fall within the allowable range.

With this processing, even when the color reproduction range of the output device is partially larger than the standard color reproduction range, color conversion parameters can be created that utilize color reproduction capability of the output device.

The first color converting unit 410 performs, by using the color conversion parameters created by the conversion parameter creating unit 430, a color conversion process on the input image data received from the input device. Specifically, RGB values of the image data are converted to JCaCb values of an output device, by using a memory map interpolation method.

The color data, converted by the first color converting unit 410 to the JCaCb values within a color reproduction range of the output device, is subjected to color conversion at the second color converting unit 420 based on the characteristics of the output device (color printer) 103 to be converted to data of output color components C, M, and Y constituting a control signal of the output device (printer) 103.

The second color converting unit 420 performs the color conversion from the JCaCb signal to a CMY(K) signal, by also using a memory map interpolation method.

The image data generated in the color conversion process is sent to the output device 103, and printed out in colors. Although the sixth embodiment describes the process performed by the first color converting unit and the process performed by the second color converting unit separately, the two processes can be combined, so that a profile for converting an input color signal to a color signal of the output device is in advance.

In the sixth embodiment, the standard color reproduction range is found by using a virtual device model. Because establishing such a virtual device model requires measurement of spectral reflectance, a standard color reproduction range is created based on color reproduction range information of an output device. The output device is an RGB device, and conversion to a CMYK signal is performed by processes performed inside the device, such as black ink generation or ink amount regulation.

Figure 30:
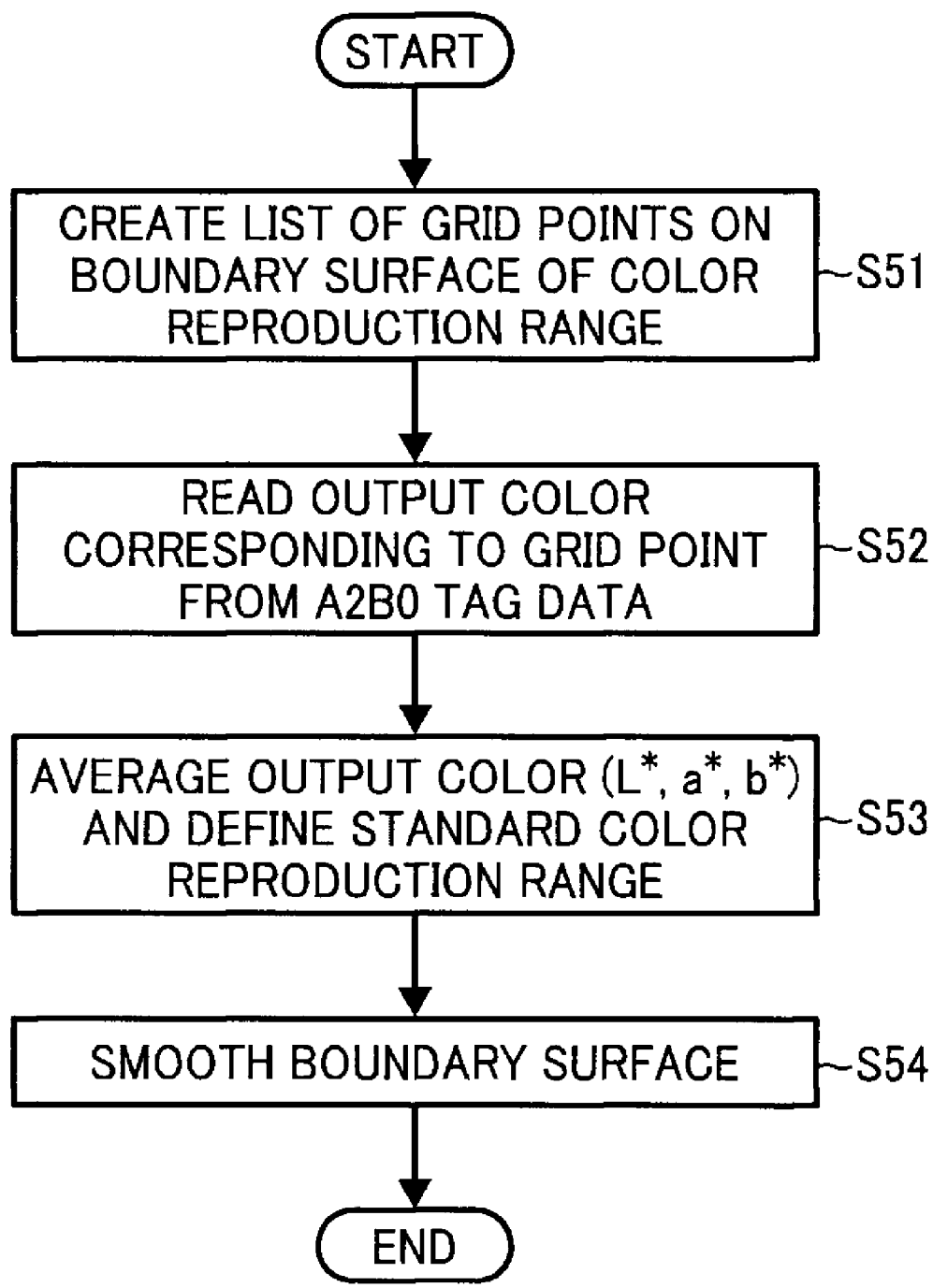
FIG. 30 is a flowchart of a process for creating a standard color reproduction range according to a seventh embodiment of the present invention.

FIG. 30 is a flowchart of a process for defining a standard color reproduction range according to a seventh embodiment of the present invention. At step S51, an input signal in the RGB color space is divided so that a list of grid point data (I, j, k) on the outermost line of the RGB color space is created for use in an output device.

At step S52, output color data (L*a*b*) corresponding to a grid point K is read out for all the output devices. As the output color data, for example, L*a*b* data is described in A2B0 tag of an ICC profile. At step S53, the L*a*b* values are averaged, and L*a*b* data in the standard color reproduction range corresponding to the grid point K are found. steps S52 and S53 are repeated for all the grid points to find a standard color reproduction range.

With the above method, because the gamut shape has distinctive concave and convex portions, the gamut shape is corrected to have a smooth shape by smoothing the boundary surface of the standard color reproduction range at step S54. The primary and secondary color lines are not smoothed for keeping good matching with a color reproduction range of an output device.

The above embodiments describe the method for creating color conversion parameters when a color reproduction range of an output device is partially larger than the standard color reproduction range Ga. Because the standard color reproduction range Ga has an average size of color reproduction ranges of a plurality of output devices, the standard color reproduction range Ga may completely cover a small color reproduction range of the output devices. In such a case, color reproduction target data defined for the standard color reproduction range Ga is mapped to the color reproduction range of that output device. This enables fast creation of color conversion parameters used in the output device and matching a target reproduction color.

Figure 31:
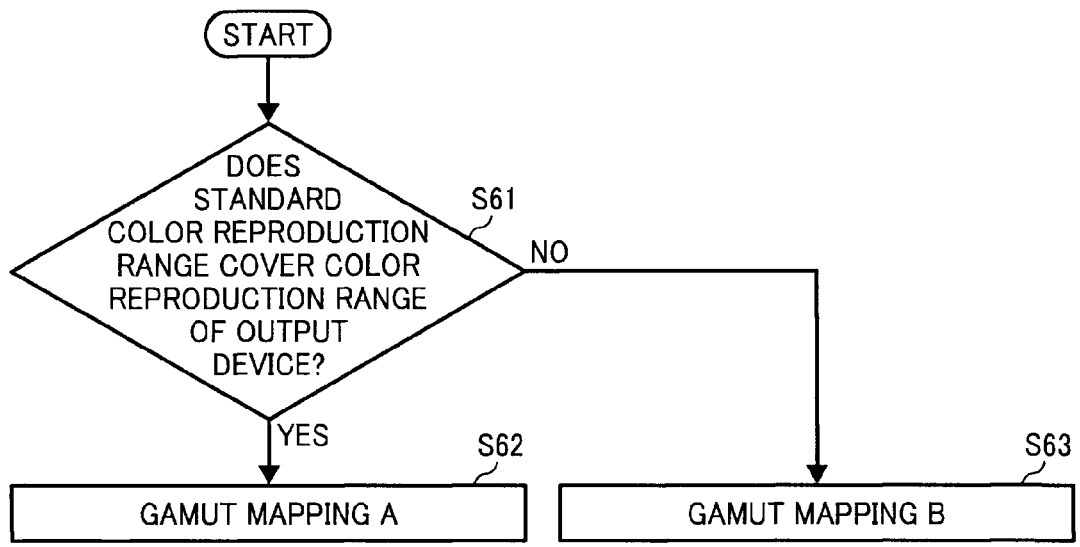
FIG. 31 is a flowchart of a color converting process according to an eighth embodiment of the present invention.

FIG. 31 is a flowchart of a color converting process according to an eighth embodiment of the present invention. At step S61, determination is made on whether the standard color reproduction range Ga covers the color reproduction range Gp of an output device. Specifically, determination is made on whether each point lying on the boundary surface of the color reproduction range of the output device is inside or outside the standard color reproduction range. This determination can be made by a known method (e.g., a method disclosed in Japanese Patent 3566350).

If all the points are inside the standard color reproduction range, the process control goes to step S62 and gamut mapping process A is performed. The gamut mapping process A includes gamut mapping by using a reference profile, and then gamut mapping to a color reproduction range of the output device.

If some points are not inside the standard color reproduction range at step S61, the process control goes to step S63 and gamut mapping process B is performed. The gamut mapping process B is a method for mapping an input color signal directly to the color reproduction range of the output device. In the gamut mapping process B, a gamut is mapped by using the process performed by the conversion parameter creating unit 430 described above in connection with FIG. 27.

Figure 32:
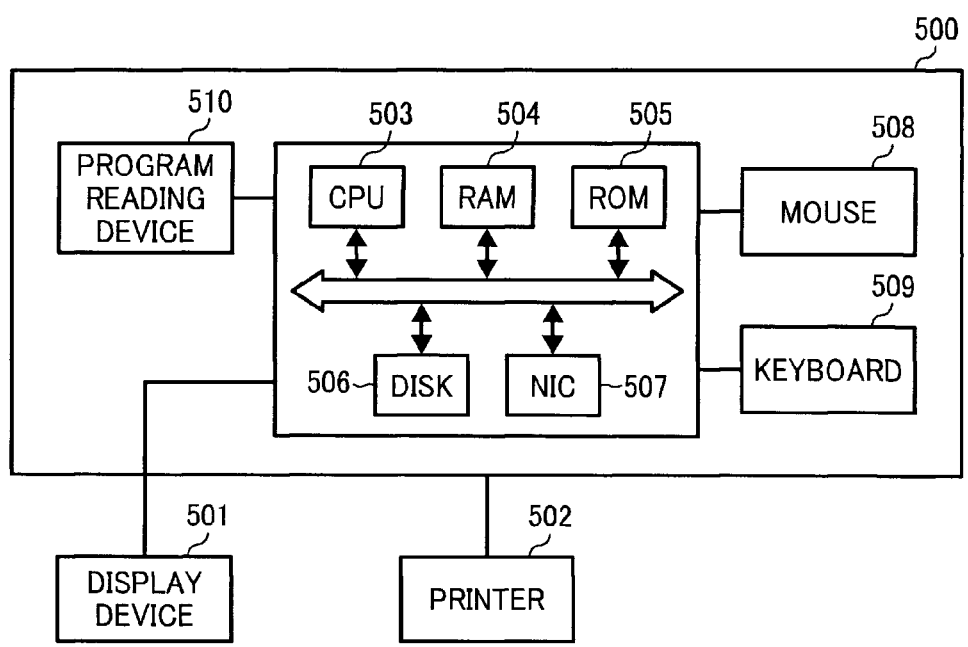
FIG. 32 is a block diagram of a computer for implementing the image processing system by software.
Figure 33A:
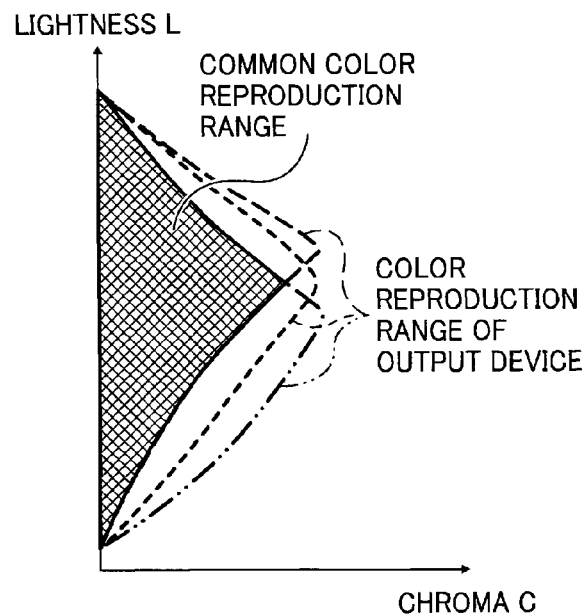
FIG. 33A is a schematic diagram of a common color reproduction range reproducible by all output devices according to a conventional technology.
Figure 33B:
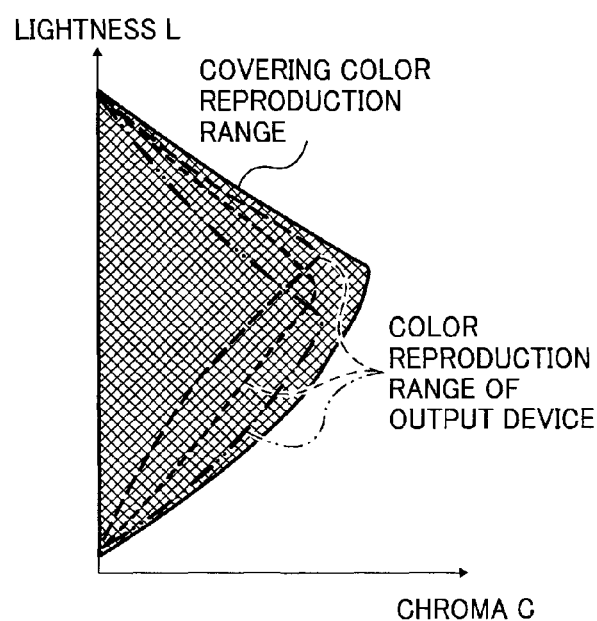
FIG. 33B is a schematic diagram of a color reproduction range that covers color reproduction ranges of all output devices according to another conventional technology.

The image processing apparatus can be implemented as software. In other words, a computer program can be executed on a computer to realize the same function as the image processing apparatus. FIG. 32 is a schematic diagram of such a computer 500. The computer 500 can be a workstation, and connected to a printer 502 and a display device 501. The workstation (computer 500), implementing functions of the color processing, includes an input device such as a mouse 508 and a keyboard 509, a program reading device 510, and computing processors. Examples of the computing processors include a central processing unit (CPU) 503 capable of implementing various commands, a read only memory (ROM) 505, and a random access memory (RAM) 504, all coupled to one another via a bus. Further, the bus connects a DISK 506 such as a hard disk serving as a high-capacity storage, and a network interface card (NIC) 507 that communicates with devices on the network.

The program reading device 510 reads out various program codes stored in a recording medium, such as a flexible disk, a hard disk, an optical disk (a compact disk read only memory (CD-ROM), a compact disk recordable (CD-R), a compact disk rewritable (CD-R/W), a digital versatile disk read only memory (DVD-ROM), a digital versatile disk random access memory (DVD-RAM), etc.), a magnet optical disk, or a memory card. Examples of the program reading device 510 include a flexible disk drive, an optical disk drive, and a magnet optical disk drive.

The program codes stored in the recording medium are read out by the program reading device, and stored in the DISK 506 or the like. By causing the CPU 503 to execute the program codes, the functions of the color processing using a reference profile can be implemented. Further, by executing program codes read out by the computer, an operating system (OS) or device driver running on the computer can perform all or part of the processing based on the commands of the program codes. With this, the functions of the color processing can also be implemented.

The color processing can be modularized. For example, functions of the conversion parameter creating processor and functions of the color processor can be provided as independent modules. Further, computer programs that implement the functions of the color conversion parameter creating processor can be a plug-in system to provide a replaceable interface.

As set forth hereinabove, according to an embodiment of the present invention, it is possible to equalize colors reproduced by output devices without degrading the color reproduction capabilities of the output devices.

Moreover, it is possible to select a virtual color reproduction area that best matches the color reproduction area of an output device at high speed.

Furthermore, a difference can be reduced between a target reproduction color and a color reproduced by output devices, which facilitates checking whether colors are reproduced based on the target reproduction color. Besides, a standard color reproduction range can be set to have a size optimal for a target output device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that converts an input color signal to a color signal reproducible by an output device, the apparatus comprising:
    a storage unit that stores therein a target reproduction color for a standard color reproduction range corresponding to average size and shape of a plurality of color reproduction ranges of a plurality of output devices;
    a converting unit that converts, by referring to the storage unit, an input color signal to a color signal reproducible by the output devices;
    a gamut processing unit that performs gamut processing for converting the input color signal to a color signal within the color reproduction ranges of the output devices;
    a calculating unit that calculates a deviation between the target reproduction color and a reproduced color obtained from the gamut processing; and
    a correcting unit that corrects a mapping parameter used in the gamut processing so that the deviation falls within an allowable range, wherein
    the calculating unit calculates the deviation by a color difference formula giving a negative value when the reproduced color obtained from the gamut processing has a higher chroma than the target reproduction color, and
    the correcting unit corrects the mapping parameter by optimizing a chroma compression parameter after optimizing a hue correction parameter.

2. The image processing apparatus according to claim 1, further comprising a range creating unit that creates, by expanding or reducing a reference color reproduction range, the standard color reproduction range in a size substantially matching the average size of the color reproduction ranges.

3. The image processing apparatus according to claim 1, further comprising a range creating unit that creates the standard color reproduction range by defining a virtual device model based on a virtual spectral reflectance and a tone value of a solid color, and calculating chroma of the solid color in a perceptually uniform color space using the virtual device model.

4. The image processing apparatus according to claim 1, further comprising:
    a range creating unit that creates the standard color reproduction range based on color reproduction range information read from the output devices, and averaging color reproduction ranges corresponding to a grid point; and
    a smoothing unit that smoothes a boundary surface of the standard color reproduction range.

5. The image processing apparatus according to claim 1, wherein the converting unit converts, when the standard color reproduction range is smaller than the color reproduction ranges of the output devices, part of the input color signal to an output color having a higher chroma than a chroma of the standard color reproduction range.

6. An image processing apparatus that converts an input color signal to a color signal reproducible by an output device, the apparatus comprising:
    a first storage unit that stores therein first data on a plurality of virtual color reproduction areas and target color data corresponding to each of the virtual color reproduction areas;

a second storage unit that stores therein second data on a color reproduction area of the output device;

a selecting unit that compares the first data and the second data to select a virtual color reproduction area;

a first converting unit that converts, based on target color data corresponding to the virtual color reproduction area selected by the selecting unit, an input color signal to a color signal falling within the virtual color reproduction area;

a second converting unit that converts the color signal obtained by the first converting unit to a color signal falling within the color reproduction area of the output device;

a gamut processing unit that performs gamut processing for converting the input color signal to a color signal within the color reproduction ranges of the output devices;

a calculating unit that calculates a deviation between the target reproduction color and a reproduced color obtained from the gamut processing; and a correcting unit that corrects a mapping parameter used in the gamut processing so that the deviation falls within an allowable range, wherein the calculating unit calculates the deviation by a color difference formula giving a negative value when the reproduced color obtained from the gamut processing has a higher chroma than the target reproduction color, and the correcting unit corrects the mapping parameter by optimizing a chroma compression parameter after optimizing a hue correction parameter.

7. The image processing apparatus according to claim 6, wherein the first data and the second data each include at least coordinate values of red, green, blue, cyan, magenta, and yellow colors in a device-independent color space, and maximum chroma in a space divided with respect to lightness and hue.

8. The image processing apparatus according to claim 6, wherein the selecting unit selects a virtual color reproduction area that completely covers the color reproduction area of the output device based on a statistic of a color difference between the first data and the second data.

9. The image processing apparatus according to claim 6, further comprising a range creating unit that creates, by expanding or reducing a reference color reproduction range, the standard color reproduction range in a size substantially matching the average size of the color reproduction ranges.

10. The image processing apparatus according to claim 6, further comprising a range creating unit that creates the standard color reproduction range by defining a virtual device model based on a virtual spectral reflectance and a tone value of a solid color, and calculating chroma of the solid color in a perceptually uniform color space using the virtual device model.

11. The image processing apparatus according to claim 6, further comprising:

a range creating unit that creates the standard color reproduction range based on color reproduction range information read from the output devices, and averaging color reproduction ranges corresponding to a grid point; and a smoothing unit that smoothes a boundary surface of the standard color reproduction range.

12. The image processing apparatus according to claim 6, wherein the first and second converting units convert, when the standard color reproduction range is smaller than the color reproduction ranges of the output devices, part of the input color signal to an output color having a higher chroma than a chroma of the standard color reproduction range.

13. An image processing method performed by an image processing apparatus for converting an input color signal to a color signal reproducible by an output device, the method comprising:

storing, in a storage unit, a target reproduction color for a standard color reproduction range corresponding to average size and shape of a plurality of color reproduction ranges of a plurality of output devices; and converting, by referring to the storage unit, an input color signal to a color signal reproducible by the output devices;

performing gamut processing for converting the input color signal to a color signal within the color reproduction ranges of the output devices;

calculating a deviation between the target reproduction color and a reproduced color obtained from the gamut processing; and correcting a mapping parameter used in the gamut processing so that the deviation falls within an allowable range, wherein the deviation is calculated by utilizing a color difference formula giving a negative value when the reproduced color obtained from the gamut processing has a higher chroma than the target reproduction color, and the mapping parameter is corrected by optimizing a chroma compression parameter after optimizing a hue correction parameter.

14. A computer-readable recording medium that stores therein a computer program that causes a computer to implement the image processing method according to claim 13.

15. The image processing method according to claim 13, further comprising creating, by expanding or reducing a reference color reproduction range, the standard color reproduction range in a size substantially matching the average size of the color reproduction ranges.

16. The image processing method according to claim 13, further comprising creating the standard color reproduction range by defining a virtual device model based on a virtual spectral reflectance and a tone value of a solid color, and calculating chroma of the solid color in a perceptually uniform color space using the virtual device model.

17. The image processing method according to claim 13, further comprising:

creating the standard color reproduction range based on color reproduction range information read from the output devices, and averaging color reproduction ranges corresponding to a grid point; and smoothing a boundary surface of the standard color reproduction range.

18. The image processing method according to claim 13, further comprising converting, when the standard color reproduction range is smaller than the color reproduction ranges of the output devices, part of the input color signal to an output color having a higher chroma than a chroma of the standard color reproduction range.

* * * * *